US006941290B2

(12) United States Patent
    Siskind

(10) Patent No.: US 6,941,290 B2
(45) Date of Patent: Sep. 6, 2005

(54) METHOD FOR COMPUTING ALL OCCURRENCES OF A COMPOUND EVENT FROM OCCURRENCES OF PRIMITIVE EVENTS

(75) Inventor: Jeffrey Mark Siskind, Lawrenceville, NJ (US)

(73) Assignee: NEC Laboratories America, Inc., Princeton, NJ (US)

(*) Notice: Subject to any disclaimer, the term of this patent is extended or adjusted under 35 U.S.C. 154(b) by 635 days.

(21) Appl. No.: 09/916,249

(22) Filed: Jul. 30, 2001

(65) Prior Publication Data

US 2002/0138458 A1 Sep. 26, 2002

Related U.S. Application Data

(60) Provisional application No. 60/247,474, filed on Nov. 10, 2000.

(51) Int. Cl.[7] .......................... G06F 17/00; G06N 7/00; G06N 7/08

(52) U.S. Cl. ......................................... 706/58; 706/45

(58) Field of Search .............................. 706/25, 45, 58, 706/49, 53, 56, 57; 704/251

(56) References Cited

U.S. PATENT DOCUMENTS

| | | | | |
|---|---|---|---|---|
| 3,647,978 A | * | 3/1972 | Hill | 704/251 |
| 5,153,922 A | * | 10/1992 | Goodridge | 704/219 |
| 5,301,320 A | * | 4/1994 | McAtee et al. | 705/9 |
| 5,966,523 A | * | 10/1999 | Uchino | 703/2 |
| 6,021,403 A | * | 2/2000 | Horvitz et al. | 706/45 |
| 6,424,370 B1 | * | 7/2002 | Courtney | 348/143 |
| 6,785,663 B2 | * | 8/2004 | Wang et al. | 706/45 |
| 6,813,312 B2 | * | 11/2004 | Tullberg et al. | 375/240.01 |

OTHER PUBLICATIONS

Kerridge et al; Synchronization Primitives for Highly Parallel Discrete Event Simulations; Proceedings of the 32nd Annual Hawaii International Conference on System Sciences; vol. Track 8; Jan. 5–8, 1999; pp 1–10.*

Siskind; Grounding Language in Perception; Artificial Intelligence Review; vol. 8; Dec. 1994; pp 371–391.*

Allen; Maintaining Knowledge About Temporal Intervals; Communications of the ACM; vol. 26, Iss. 1; Nov. 1983; pp 832–843.*

Chow; A Generalized Assertion Language; Proceedings of the 2nd International Conference on Software Engineering; Oct. 1976.*

Thiele et al; On Fuzzy Temporal Logic; Second IEEE International Conference on Fuzzy Systems; vol. 2; Mar. 28–Apr. 1, 1993; pp 1027–1032.*

Abe. N. et al., "A Plot Understanding System on Reference to Both Image and Lanaguge," Proceedings of the Seventh International Joint Conference on Artificial Intelligence, Vancouver, Canada, pp. 77–84, Aug. 1981.

(Continued)

*Primary Examiner*—Anthony Knight
*Assistant Examiner*—Meltin Bell

(57) ABSTRACT

A method for computing all occurrences of a compound event from occurrences of primitive events where the compound event is a defined combination of the primitive events. The method includes the steps of: (a) defining primitive event types; (b) defining combinations of the primitive event types as a compound event type; (c) inputting the primitive event occurrences, such occurrences being specified as the set of temporal intervals over which a given primitive event type is true; and (d) computing the compound event occurrences, such occurrences being specified as the set of temporal intervals over which the compound event type is true, where the sets of temporal intervals in steps (c) and (d) are specified as smaller sets of spanning intervals, each spanning interval representing a set of intervals.

5 Claims, 19 Drawing Sheets

OTHER PUBLICATIONS

Abe, N. et al., "A Learning of Object Structures by Verbalism," COLING 82, pp. 1–8, 1982.

Adler, M.R., "Computer Interpretation of Peanuts Cartoons," 5th International Joint Conference on Artificial Intelligence, Cambridge, MA, pp. 608, Aug. 1977.

Allen, J.R., "Maintaining Knowledge About Temporal Intervals," Communications of the ACM, vol. 26, No. 11, pp. 832–843, Nov. 1983.

Blum, M. et al., "A Stability Test for Configurations of Blocks," Artificial Intelligence Memo No. 168, Massachusetts Institute of Technology, Feb. 1970.

Bobick, A.F. et al., "Action Recognition using Probabilistic Parsing," Proceedings of the IEEE Computer Society Conference on Computer Vision and Pattern Recognition, pp. 196–202, Jun. 1998.

Borchardt, G.C., "A Computer Model for the Representation and Identification of Physical Events," Masters Thesis, University of Kansas, May 1984.

Borchardt, G.C., "Events Calculus," Proceedings of the Ninth International Joint Conference on Artificial Intelligence, pp. 524–527, Aug. 1985.

Brand, M. et al., "Sensible Scenes: Visual Understanding of Complex Structures Through Causal Analysis," Proceedings of the Eleventh National Conference on Artificial Intelligence, pp. 588–593, 1993.

Fahlman, S.E., "A Planning System for Robot Construction Tasks," Artificial Intelligence, vol. 5, No. 1, pp. 1–49, 1974.

Krifka, M., "Thematic Relations as Links Between Nominal Reference and Temporal Constitution," Lexical Matters, Sag, I.A. (eds.), pp. 29–53, 1992.

Mann, R. et al., "Towards the Computational Perception on Action," Proceedings of the IEEE Computer Society Conference on Computer Vision and Pattern Recognition, Santa Barbara, CA, pp. 794–799, 1998.

Mann, R. et al., "The Computational Perception of Scene Dynamics," Computer Vision and Image Understanding, vol. 65, No. 2, pp. 113–128, Feb. 1997.

McCarthy, J., "Circumscription—A Form of Non–Monotonic Reasoning," Artificial Intelligence, vol. 13, pp. 27–39, 1980.

Okada, N., "SUPP: Understanding Moving Picture Patterns Based on Linguistic Knowledge," Proceedings of the Sixth International Joint Conference on Artificial Intelligence, Tokyo, Japan, pp. 690–692, Aug. 1979.

Regier, T.P., "The Acquisition of Lexical Seminatics for Spatial Terms: A Connectionist Model of Perceptual Categorization," Ph.D. Thesis, University of California, Berkeley, 1992.

Shoham, Y., "Temporal Logics in AI: Semantical and Ontological Considerations," Artificial Intelligence, vol. 33, pp. 89–104, 1987.

Siskind, J.M., "Naive Physics, Event Perception, Lexical Semanics, and Language Acquisition," Ph.D. Thesis, Massachusetts Institute of Technology, 1992.

Siskind, J.M., "Axiomatic Support for Event Perception," Proceedings of the AAAI–94 Workshop on the Integration of Natural Language and Vision Processing. Seattle, WA, pp. 153–160, Aug. 1994.

Siskind, J.M., "Grounding Language in Perception," Artificial Intelligence Review, vol. 8, pp. 371–391, Dec. 1994.

Siskind, J.M., "Unsupervised Learning of Visually–Observed Events," AAAI Fall Symposium Series on Learning Complex Behaviors in Adaptive Intelligence Systems, pp. 82–83, 1996.

Siskind, J.M., "Visual Event Perception", Proceedings of the 9th NEC Research Symposium, Princeton, NJ, Mar. 1999.

Siskind, J.M., "Visual Event Classification via Force Dynamics," Proceedings of the Seventeenth National Conference on Artificial Intelligence, Aug. 2000.

Siskind, J.M. et al., "A Maximum–Likelihood Approach to Visual Event Classification," Proceedings of the 4th European Conference on Computer Vision, Cambridge, UK, pp. 347–360, Apr. 1996.

Starner, T.E., "Visual Recognition of American Sign Language Using Hidden Markov Models," Masters Thesis, Massachusetts Institute of Technology, Feb. 1995.

Talmy, L., "Force Dynamics in Language and Cognition," Cognitive Science, vol. 12, pp. 49–100, 1988.

Thibadeau, R., "Artificial Perception of Actions," Cognitive Science, vol. 10, No. 2, pp. 117–149, 1986.

Tsuji, S. et al., "Understanding a Simple Cartoon Film by a Computer Vision System," Proceedings of the 5th International Joint Conference on Artificial Intelligence, Cambridge MA, pp. 609–610, Aug. 1977.

Tsuji, S. et al., "Three Dimensional Movement Analysis of Dynamic Line Images," Proceedings of the Sixth International Joint Conference on Artificial Intelligence, Tokyo, Japan, pp. 896–901, Aug. 1979.

Tsuji, S. et al., "Tracking and Segmentation of Moving Objects in Dynamic Line Images," IEEE Transactions on Pattern Analysis and Machine Intelligence, vol. 2, No. 6, pp. 516–522, 1980.

Waltz, D.L., "Toward a Detailed Model of Processing for Language Describing the Physical World," Proceedings of the Seventh International Joint Conference on Artificial Intelligence, Vancouver, Canada, pp. 1–6, Aug. 1981.

Waltz, D.L., "Visual Analog Representations for Natural Language Understanding," Proceedings of the Sixth International Joint Conference on Artificial Intelligence, Tokyo, Japan, pp. 926–934, Aug. 1979.

Yamato, J. et al., "Recognizing Human Action in Time–Sequential Images using Hidden Markov Model," Proceedings of the IEEE Conference on Computer Vision and Pattern Recognition, pp. 379–385, 1992.

Chow; A Generalized Assertion Language; Proceedings of the 2nd International Conference on Software Engineering; Oct. 1976; pp 392–399.*

Thiele et al; On Fuzzy Temporal Logic; Second IEEE International Conference on Fuzzy Systems', vol. 2., Mar. 28–Apr 1, 1993., pp 1027–1032.*

Kerridge et al; Synchronization Primitives for Highly Parallel Discrete Event Simulations', Proceedings of the 32nd Annual Hawaii International Conference on System Sciences, vol. Track 8, Jan. 5–8, 1999, pp 1–10.*

* cited by examiner $$x = y \triangleq \overline{x = y}$$
$$\text{SUPPORTED}(x) \triangleq \overline{\neg \text{GROUNDED}(x)}$$
$$\text{RIGIDLYATTACHED}(x,y) \triangleq \overline{(\exists r)\text{RIGID}(x,y,r)}$$
$$\text{SUPPORTS}(x,y) \triangleq \overline{\left(\begin{array}{l}\neg \text{GROUNDED}(y) \land \\ \neg \text{STABLE}(P \setminus \{x\}, M \cup \{\text{GROUNDED}(z) | \neg \text{RIGIDLYATTACHED}^*(z,y)\})\end{array}\right)}$$
$$\text{CONTACTS}(x,y) \triangleq \overline{\text{TOUCHES}(x,y) \land x \bowtie y}$$
$$\text{ATTACHED}(x,y) \triangleq \overline{(\exists r)\text{RIGID}(x,y,r) \lor \text{REVOLUTE}(x,y,r)}$$

FIG. 3

$$\text{PickUp}(x,y,z) \triangleq \left\{ \begin{array}{l} \neg \Diamond x = y \land \neg \Diamond z = x \land \neg \Diamond z = y \land \\ \text{Supported}(y) \land \neg \Diamond \text{Attached}(x,z) \land \\ \left\{ \begin{array}{l} \left[ \begin{array}{l} \neg \Diamond \text{Attached}(x,y) \land \neg \Diamond \text{Supports}(x,y) \land \\ \text{Supports}(z,y) \land \\ \neg \Diamond \text{Supported}(x) \land \neg \Diamond \text{Attached}(y,z) \land \\ \neg \Diamond \text{Supports}(y,x) \land \neg \Diamond \text{Supports}(y,z) \land \\ \neg \Diamond \text{Supports}(x,z) \land \neg \Diamond \text{Supports}(z,x) \end{array} \right] ; \\ [\text{Attached}(x,y) \lor \text{Attached}(y,z)] ; \\ \left[ \begin{array}{l} \text{Attached}(x,y) \land \text{Supports}(x,y) \land \\ \neg \Diamond \text{Supports}(z,y) \land \\ \neg \Diamond \text{Supported}(x) \land \neg \Diamond \text{Attached}(y,z) \land \\ \neg \Diamond \text{Supports}(y,x) \land \neg \Diamond \text{Supports}(y,z) \land \\ \neg \Diamond \text{Supports}(x,z) \land \neg \Diamond \text{Supports}(z,x) \end{array} \right] \end{array} \right\} \end{array} \right\}$$

$$\text{PutDown}(x,y,z) \triangleq \left\{ \begin{array}{l} \neg \Diamond x = y \land \neg \Diamond z = x \land \neg \Diamond z = y \land \\ \text{Supported}(y) \land \neg \Diamond \text{Attached}(x,z) \land \\ \left\{ \begin{array}{l} \left[ \begin{array}{l} \text{Attached}(x,y) \land \text{Supports}(x,y) \land \\ \neg \Diamond \text{Supports}(z,y) \land \\ \neg \Diamond \text{Supported}(x) \land \neg \Diamond \text{Attached}(y,z) \land \\ \neg \Diamond \text{Supports}(y,x) \land \neg \Diamond \text{Supports}(y,z) \land \\ \neg \Diamond \text{Supports}(x,z) \land \neg \Diamond \text{Supports}(z,x) \end{array} \right] ; \\ [\text{Attached}(x,y) \lor \text{Attached}(y,z)] ; \\ \left[ \begin{array}{l} \neg \Diamond \text{Attached}(x,y) \land \neg \Diamond \text{Supports}(x,y) \land \\ \text{Supports}(z,y) \land \\ \neg \Diamond \text{Supported}(x) \land \neg \Diamond \text{Attached}(y,z) \land \\ \neg \Diamond \text{Supports}(y,x) \land \neg \Diamond \text{Supports}(y,z) \land \\ \neg \Diamond \text{Supports}(x,z) \land \neg \Diamond \text{Supports}(z,x) \end{array} \right] \end{array} \right\} \end{array} \right\}$$

$$\text{Stack}(w,x,y,z) \triangleq \left[ \begin{array}{l} \neg \Diamond z = w \land \neg \Diamond z = x \land \neg \Diamond z = y \land \\ \text{PutDown}(w,x,y) \land \text{Supports}(z,y) \land \neg \text{Attached}(z,y) \end{array} \right]$$

$$\text{Unstack}(w,x,y,z) \triangleq \left[ \begin{array}{l} \neg \Diamond z = w \land \neg \Diamond z = x \land \neg \Diamond z = y \land \\ \text{PickUp}(w,x,y) \land \text{Supports}(z,y) \land \neg \text{Attached}(z,y) \end{array} \right]$$

$$\text{Move}(w,x,y,z) \triangleq \neg \Diamond y = z \land [\text{PickUp}(w,x,y); \text{PutDown}(w,x,z)]$$

$$\text{Assemble}(w,x,y,z) \triangleq \text{PutDown}(w,y,z) \land_{\{<\}} \text{Stack}(w,x,y,z)$$

$$\text{Disassemble}(w,x,y,z) \triangleq \text{Unstack}(w,x,y,z) \land_{\{<\}} \text{PickUp}(x,y,z)$$

FIG. 4

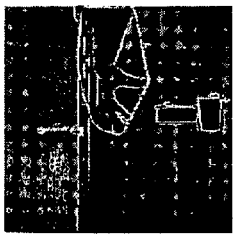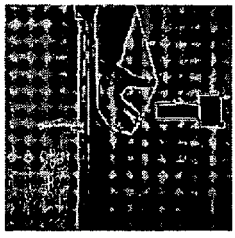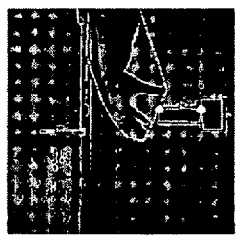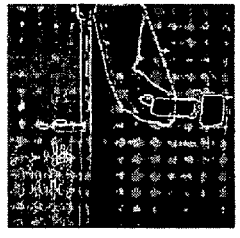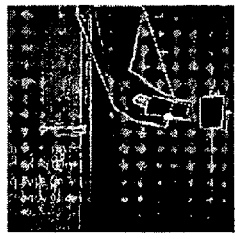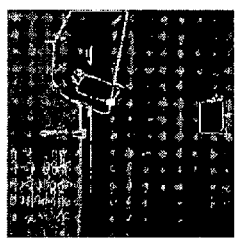
FIG. 5A
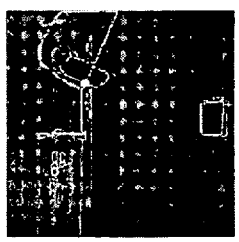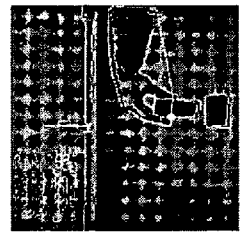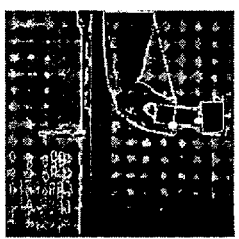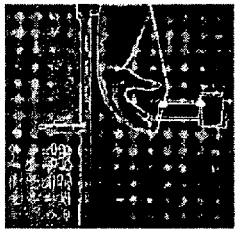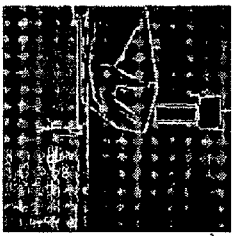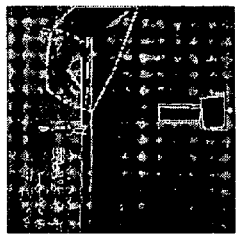
FIG. 5B

```
(PICK-UP MOVING RED GREEN)@{[[0,1],[14,22]]}

(SUPPORTED? RED)@{[[0:22]]}
(SUPPORTED? MOVING)@{[[1:13]], [[24:26]]}
(SUPPORTS? RED MOVING)@{[[1:13]], [[24:26]]}
(SUPPORTS? MOVING RED)@{[[13:22]]}
(SUPPORTS? GREEN RED)@{[[0:14]]}
(SUPPORTS? GREEN MOVING)@{[[1:13]]}
(CONTACTS? RED GREEN)@{[[0:2]], [[6:14]]}
(ATTACHED? RED MOVING)@{[[1:26]]}
(ATTACHED? RED GREEN)@{[[1:6]]}
```

FIG. 6A

```
(PUT-DOWN MOVING RED GREEN)@{[[0,14],[23,32]]}

(SUPPORTED? MOVING)@{[[14:23]]}
(SUPPORTED? RED)@{[[0:32]]}
(SUPPORTS? MOVING RED)@{[[0:14]]}
(SUPPORTS? RED MOVING)@{[[14:23]]}
(SUPPORTS? GREEN MOVING)@{[[14:23]]}
(SUPPORTS? GREEN RED)@{[[14:32]]}
(CONTACTS? RED GREEN)@{[[22:32]]}
(ATTACHED? MOVING RED)@{[[0:23]]}
(ATTACHED? RED GREEN)@{[[14:22]]}
```

FIG. 6B

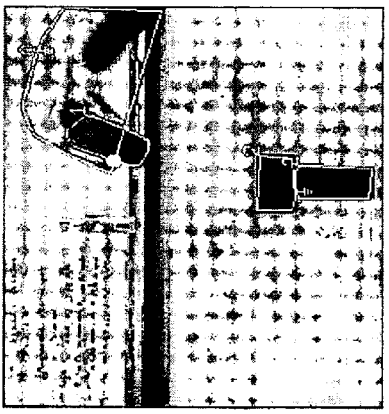
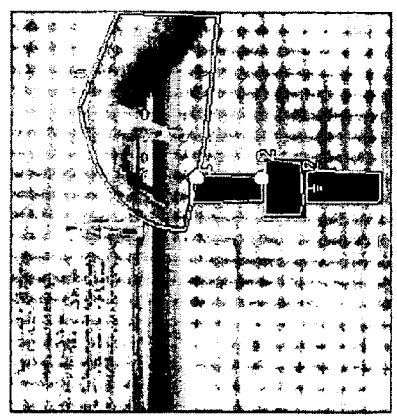
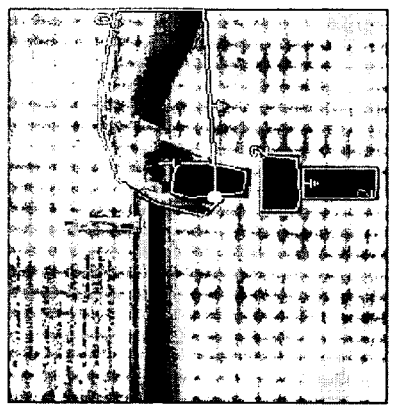
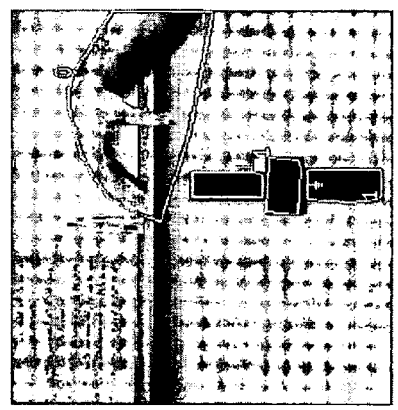
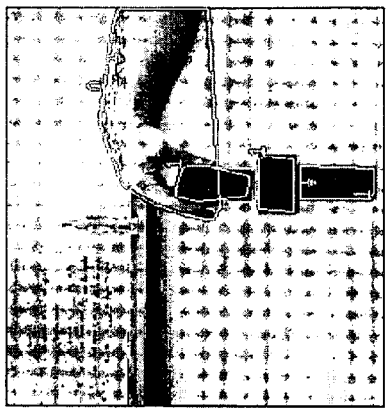
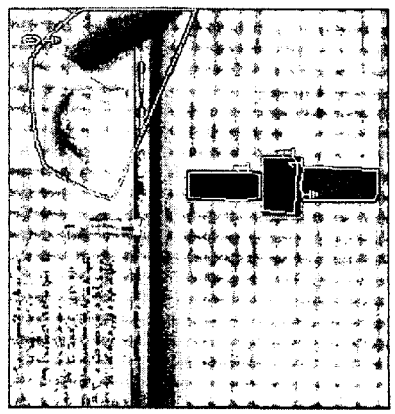
FIG. 7A

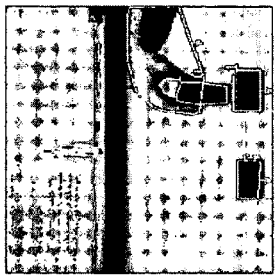
frame 16
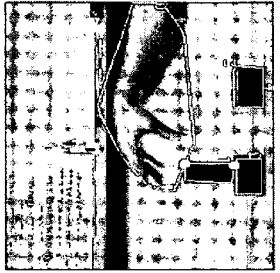
frame 45
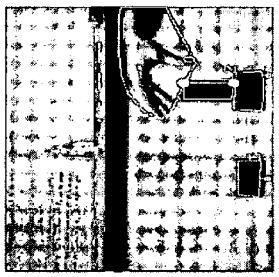
frame 9
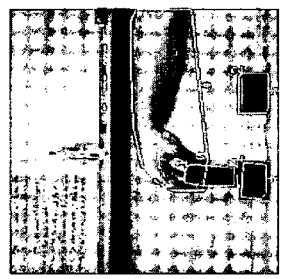
frame 34
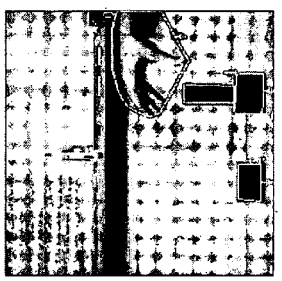
frame 8
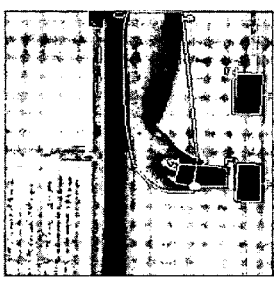
frame 33
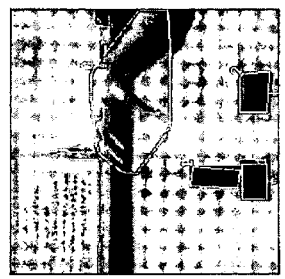
frame 52
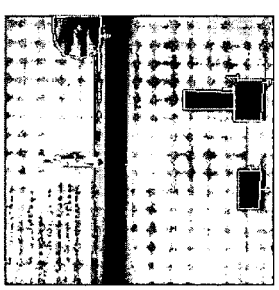
frame 0
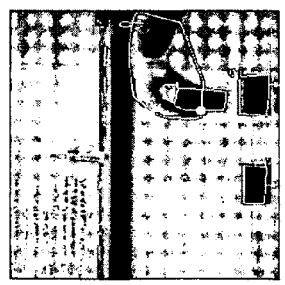
frame 17
frame 46
FIG. 7C

```
(PUT-DOWN MOVING RED BLUE)@([[0,12],[24,30]])
(STACK MOVING RED BLUE GREEN)@([[0,12],[24,30]])

(SUPPORTED? MOVING)@([[13:24]])
(SUPPORTED? RED)@([[0:30]])
(SUPPORTED? BLUE)@([[0:30]])
(SUPPORTS? MOVING RED)@([[0:12]])
(SUPPORTS? RED MOVING)@([[13:24]])
(SUPPORTS? RED BLUE)@([[19:20]], [[21:22]])
(SUPPORTS? GREEN MOVING)@([[19:20]], [[21:22]])
(SUPPORTS? GREEN RED)@([[19:20]], [[21:22]])
(SUPPORTS? GREEN BLUE)@([[0:30]])
(SUPPORTS? BLUE MOVING)@([[13:24]])
(SUPPORTS? BLUE RED)@([[12:30]])
(CONTACTS? RED BLUE)@([[12:19]], [[20:21]], [[22:30]])
(CONTACTS? GREEN BLUE)@([[0:30]])
(ATTACHED? MOVING RED)@([[0:24]])
(ATTACHED? RED BLUE)@([[19:20]], [[21:22]])
```

FIG. 8A

```
(PICK-UP MOVING RED BLUE)@([[0,11],[25,33]])
(UNSTACK MOVING RED BLUE GREEN)@([[0,11],[25,33]])

(SUPPORTED? MOVING)@([[11:23]])
(SUPPORTED? RED)@([[0:36]])
(SUPPORTED? BLUE)@([[0:36]])
(SUPPORTS? MOVING RED)@([[23:36]])
(SUPPORTS? RED MOVING)@([[11:23]])
(SUPPORTS? RED BLUE)@([[13:14]])
(SUPPORTS? GREEN MOVING)@([[13:14]])
(SUPPORTS? GREEN RED)@([[13:14]])
(SUPPORTS? GREEN BLUE)@([[0:36]])
(SUPPORTS? BLUE MOVING)@([[11:23]])
(SUPPORTS? BLUE RED)@([[0:25]])
(CONTACTS? MOVING RED)@([[34:36]])
(CONTACTS? RED BLUE)@([[0:13]], [[14:24]])
(CONTACTS? GREEN BLUE)@([[0:13]], [[14:36]])
(ATTACHED? MOVING RED)@([[11:33]])
(ATTACHED? RED BLUE)@([[13:14]])
(ATTACHED? GREEN BLUE)@([[13:14]])
```

FIG. 8B

```
(PICK-UP MOVING RED GREEN)@([[0,9],[17,46]])
(PUT-DOWN MOVING RED BLUE)@([[17,36],[46,52]])
(MOVE MOVING RED GREEN BLUE)@([[0,9],[46,52]])

(SUPPORTED? MOVING)@([[9:15]])
(SUPPORTED? RED)@([[0:52]])
(SUPPORTED? BLUE)@([[36:46]])
(SUPPORTS? MOVING RED)@([[17:46]])
(SUPPORTS? MOVING BLUE)@([[36:46]])
(SUPPORTS? RED MOVING)@([[9:15]])
(SUPPORTS? RED BLUE)@([[35:46]])
(SUPPORTS? GREEN MOVING)@([[9:15]])
(SUPPORTS? GREEN RED)@([[0:17]])
(SUPPORTS? BLUE RED)@([[46:52]])
(CONTACTS? RED GREEN)@([[0:17]])
(CONTACTS? RED BLUE)@([[46:52]])
(ATTACHED? MOVING RED)@([[9:46]])
(ATTACHED? RED BLUE)@([[35:46]])
```

FIG. 8C

```
(PUT-DOWN MOVING RED GREEN)@([[57,68],[68,87]])
(PUT-DOWN MOVING GREEN BLUE)@([[18,35],[41,47]])
(STACK MOVING RED GREEN BLUE)@([[57,68],[68,87]])
(ASSEMBLE MOVING RED GREEN BLUE)@([[18,35],[68,87]])

(SUPPORTED? MOVING)@([[10:18]], [[47:57]])
(SUPPORTED? RED)@([[57:87]])
(SUPPORTED? GREEN)@([[11:87]])
(SUPPORTED? BLUE)@([[35:41]])
(SUPPORTS? MOVING RED)@([[57:68]])
(SUPPORTS? MOVING GREEN)@([[11:41]])
(SUPPORTS? MOVING BLUE)@([[35:41]])
(SUPPORTS? RED MOVING)@([[10:18]], [[47:57]])
(SUPPORTS? RED GREEN)@([[11:16]])
(SUPPORTS? GREEN RED)@([[68:87]])
(SUPPORTS? GREEN BLUE)@([[35:41]])
(SUPPORTS? BLUE GREEN)@([[41:87]])
(CONTACTS? RED GREEN)@([[68:87]])
(CONTACTS? GREEN BLUE)@([[41:87]])
(ATTACHED? MOVING RED)@([[11:16]], [[49:68]])
(ATTACHED? MOVING GREEN)@([[11:41]])
(ATTACHED? GREEN BLUE)@([[35:41]])
```

FIG. 8D

```
(PICK-UP MOVING RED GREEN)@([[0,19],[23,50]])
(PICK-UP MOVING GREEN BLUE)@([[22,58],[62,87]])
(UNSTACK MOVING RED GREEN BLUE)@([[0,19],[23,50]])
(DISASSEMBLE MOVING RED GREEN BLUE)@([[0,19],[62,87]])

(SUPPORTED? MOVING)@([[19:22]])
(SUPPORTED? RED)@([[0:50]])
(SUPPORTED? GREEN)@([[0:87]])
(SUPPORTED? BLUE)@([[58:62]])
(SUPPORTS? MOVING RED)@([[23:50]])
(SUPPORTS? MOVING GREEN)@([[58:87]])
(SUPPORTS? MOVING BLUE)@([[58:62]])
(SUPPORTS? RED MOVING)@([[19:22]])
(SUPPORTS? GREEN MOVING)@([[19:22]])
(SUPPORTS? GREEN RED)@([[0:23]])
(SUPPORTS? GREEN BLUE)@([[58:62]])
(SUPPORTS? BLUE GREEN)@([[0:58]])
(CONTACTS? RED GREEN)@([[0:23]])
(CONTACTS? GREEN BLUE)@([[0:58]])
(ATTACHED? MOVING RED)@([[19:50]])
(ATTACHED? MOVING GREEN)@([[58:87]])
(ATTACHED? GREEN BLUE)@([[58:62]])
```

FIG. 8E

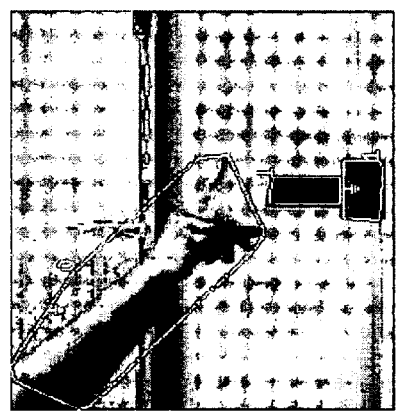
frame 10
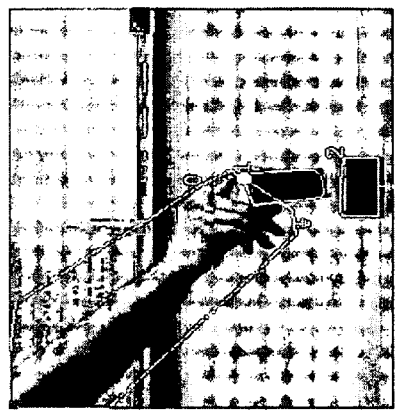
frame 18
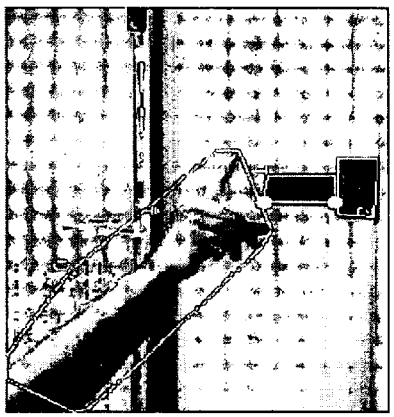
frame 11
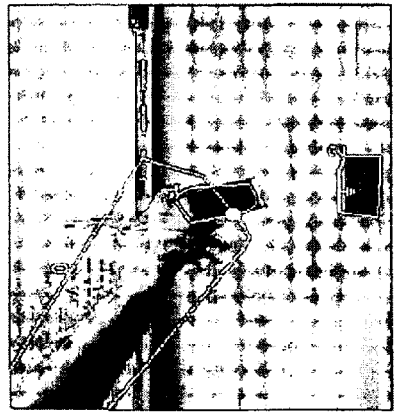
frame 22
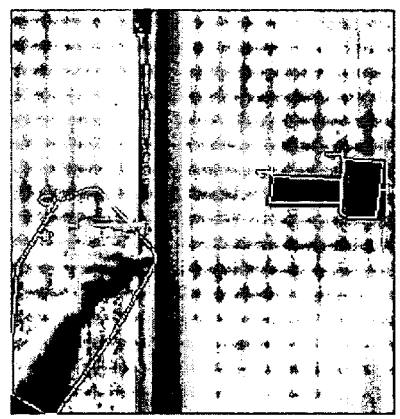
frame 5
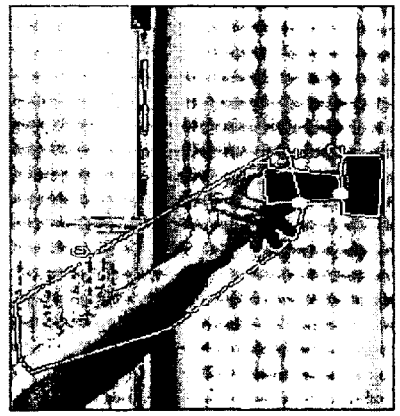
frame 17
FIG. 9A

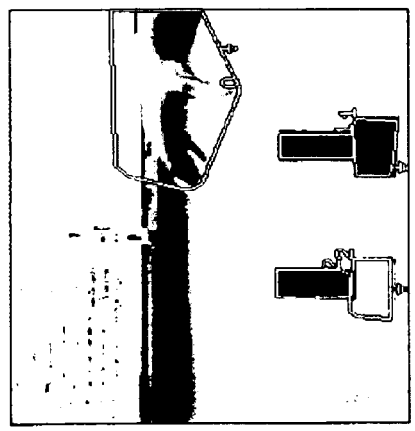
frame 6
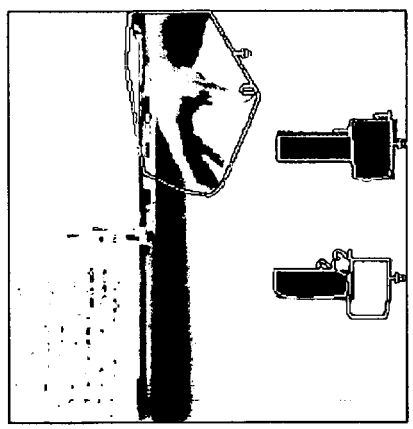
frame 7
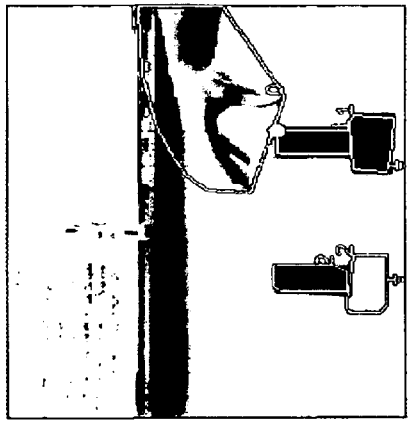
frame 8
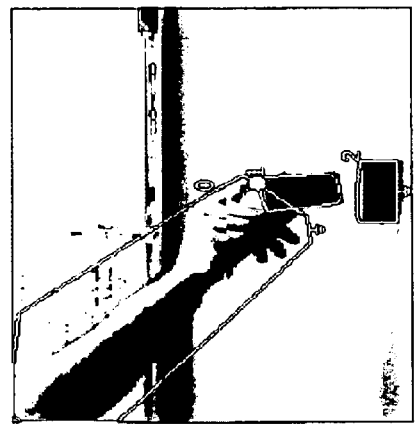
frame 18
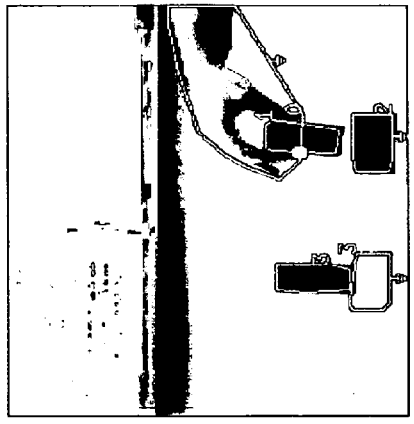
frame 19
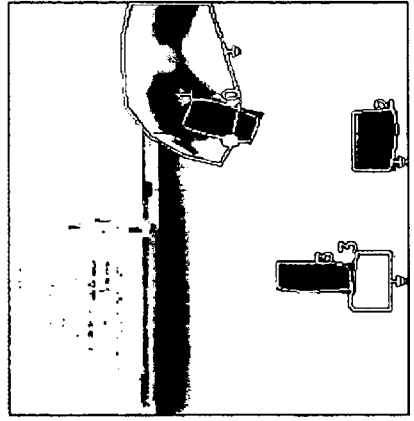
frame 24
FIG. 9B

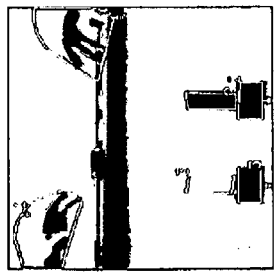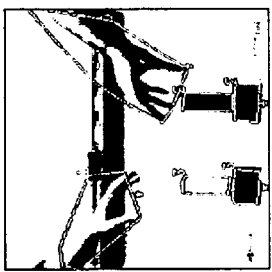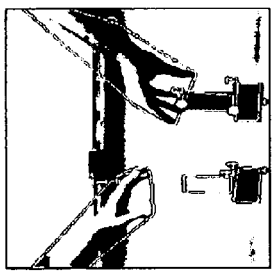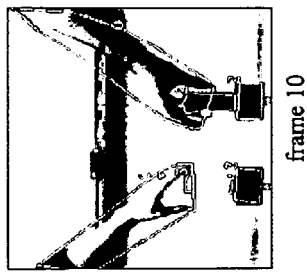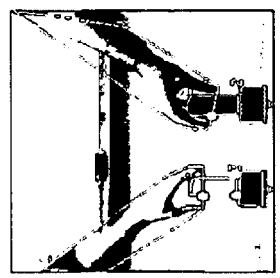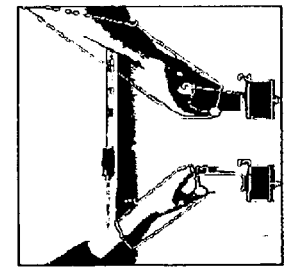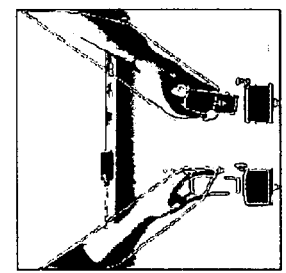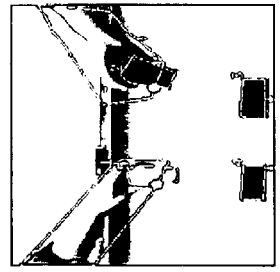
FIG. 9D

```
(PICK-UP MOVING RED GREEN)@([[0,11],[18,30]])

(SUPPORTED? RED)@([[0:30]])
(SUPPORTED? GREEN)@([[11:18]])
(SUPPORTS? MOVING RED)@([[11:30]])
(SUPPORTS? MOVING GREEN)@([[11:18]])
(SUPPORTS? RED GREEN)@([[11:18]])
(SUPPORTS? GREEN RED)@([[0:11]])
(CONTACTS? RED GREEN)@([[0:11]])
(ATTACHED? MOVING RED)@([[11:30]])
(ATTACHED? RED GREEN)@([[11:18]])
```

FIG. 10A

```
(PICK-UP MOVING RED GREEN)@([[0,8],[19,30]])

(SUPPORTED? MOVING)@([[8:19]])
(SUPPORTED? RED)@([[0:30]])
(SUPPORTED? BLUE)@([[0:30]])
(SUPPORTS? MOVING RED)@([[19:30]])
(SUPPORTS? RED MOVING)@([[8:19]])
(SUPPORTS? GREEN MOVING)@([[8:19]])
(SUPPORTS? GREEN RED)@([[0:19]])
(SUPPORTS? YELLOW BLUE)@([[0:30]])
(CONTACTS? RED GREEN)@([[0:10]], [[16:19]])
(CONTACTS? BLUE YELLOW)@([[0:30]])
(ATTACHED? MOVING RED)@([[8:30]])
(ATTACHED? RED GREEN)@([[10:16]])
```

FIG. 10B

```
(PICK-UP MOVING RED GREEN)@([[52,70],[78,102]], [[0,9],[19,44]])
(PUT-DOWN MOVING RED GREEN)@([[19,44],[52,70]], [[78,102],[110,117]])

(SUPPORTED? MOVING)@([[9:18]], [[44:52]], [[70:77]], [[102:110]])
(SUPPORTED? RED)@([[0:117]])
(SUPPORTS? MOVING RED)@([[18:44]], [[78:102]])
(SUPPORTS? RED MOVING)@([[9:18]], [[44:52]], [[70:77]], [[102:110]])
(SUPPORTS? GREEN MOVING)@([[9:18]], [[44:52]], [[70:77]], [[102:110]])
(SUPPORTS? GREEN RED)@([[0:19]], [[44:78]], [[102:117]])
(CONTACTS? RED GREEN)@([[0:9]], [[13:18]], [[46:70]], [[106:117]])
(ATTACHED? MOVING RED)@([[9:52]], [[70:110]])
(ATTACHED? RED GREEN)@([[9:13]], [[70:76]], [[104:106]])
```

FIG. 10C

```
(PICK-UP MOVING RED GREEN)@([[0,6],[16,22]])
(PICK-UP MOVING YELLOW BLUE)@([[0,12],[17,22]])

(SUPPORTED? MOVING)@([[6:16]])
(SUPPORTED? MOVING)@([[12:15]])
(SUPPORTED? RED)@([[0:22]])
(SUPPORTED? YELLOW)@([[0:22]])
(SUPPORTS? MOVING RED)@([[16:22]])
(SUPPORTS? MOVING YELLOW)@([[17:22]])
(SUPPORTS? RED MOVING)@([[6:16]])
(SUPPORTS? GREEN MOVING)@([[6:16]])
(SUPPORTS? GREEN RED)@([[0:16]])
(SUPPORTS? BLUE MOVING)@([[12:15]])
(SUPPORTS? BLUE YELLOW)@([[0:17]])
(SUPPORTS? YELLOW MOVING)@([[12:15]])
(CONTACTS? RED GREEN)@([[0:15]])
(CONTACTS? BLUE YELLOW)@([[0:17]])
(ATTACHED? MOVING RED)@([[6:22]])
(ATTACHED? MOVING YELLOW)@([[12:22]])
```

FIG. 10D

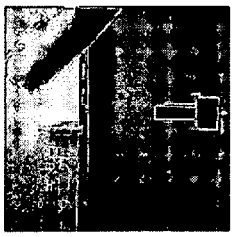 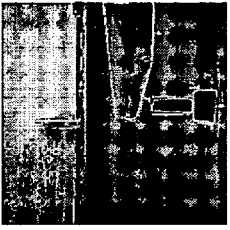 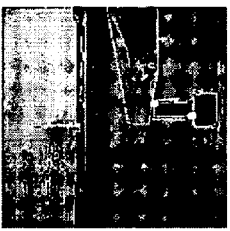 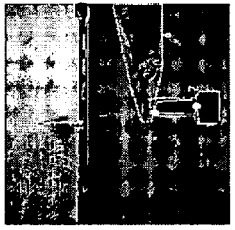 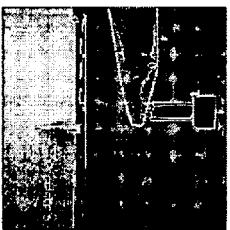 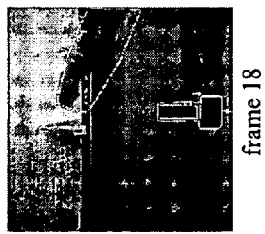
FIG. 11A
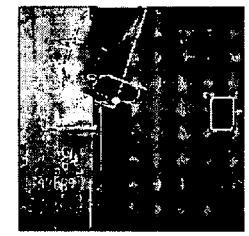 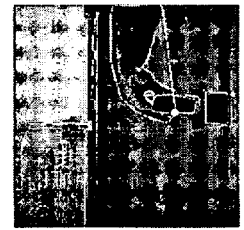 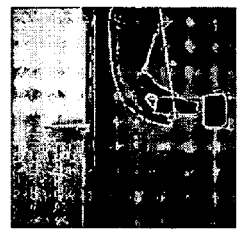 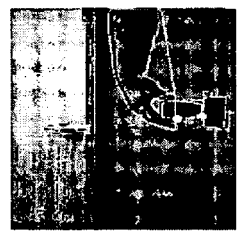 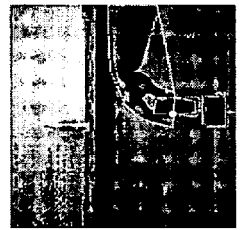 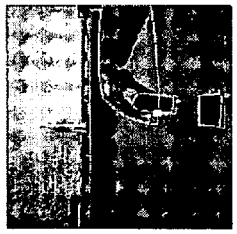
FIG. 11B

```
(SUPPORTED? RED)@{[[0:25]])}
(SUPPORTED? GREEN)@{[[7:13]]}
(SUPPORTS? MOVING RED)@{[[7:13]])}
(SUPPORTS? MOVING GREEN)@{[[7:13]])}
(SUPPORTS? RED GREEN)@{[[7:13]])}
(SUPPORTS? GREEN RED)@{[[0:7]], [[13:25]])}
(CONTACTS? RED GREEN)@{[[0:7]], [[13:25]])}
(ATTACHED? MOVING RED)@{[[7:13]])}
(ATTACHED? RED GREEN)@{[[7:13]])}
```

FIG. 12A

```
(SUPPORTED? RED)@{[[0:19]])}
(SUPPORTED? MOVING)@{[[13:31]])}
(SUPPORTS? RED MOVING)@{[[13:31]])}
(SUPPORTS? MOVING RED)@{[[0:13]])}
(SUPPORTS? GREEN RED)@{[[12:19]])}
(SUPPORTS? GREEN MOVING)@{[[13:19]])}
(ATTACHED? RED MOVING)@{[[0:31]])}
(ATTACHED? RED GREEN)@{[[13:19]])}
```

FIG. 12B

METHOD FOR COMPUTING ALL OCCURRENCES OF A COMPOUND EVENT FROM OCCURRENCES OF PRIMITIVE EVENTS

CROSS-REFERENCE TO RELATED APPLICATION

This application claims the benefit of U.S. Provisional Application No. 60/247,474 filed Nov. 10, 2000.

FIELD OF THE INVENTION

The present invention relates generally to methods for computing occurrences of compound events and, more particularly, to methods for computing occurrences of compound events from occurrences of primitive events where such occurrences are specified as a set of temporal intervals over which the compound event type is true.

BACKGROUND OF THE INVENTION

Event logic provides a calculus for forming compound event types as expressions over primitive event types. The syntax and semantics of event logic will be described momentarily. Event-logic expressions denote event types, not event occurrences. As such, they do not have truth values. Rather, they are predicates that describe the truth conditions that must hold of an interval for an event to occur. In contrast, an event-occurrence formula does have a truth value. If $\Phi$ is an event-logic expression that denotes a primitive or compound event type, and i is an interval, then $\Phi@i$ is an atomic event-occurrence formula that is true if and only if the truth conditions for the event type $\Phi$ hold of the interval i.

$\Phi@i$ denotes coincidental occurrence, the fact that an occurrence of $\Phi$ started at the beginning of i and finished at the end of i. $\Phi@i$ would not hold if an occurrence of $\Phi$ did not precisely coincide with i, but instead overlapped with i. Event types have internal temporal structure that render this distinction important. In the case of primitive event types, that structure is simple. Each primitive event type is derived from a static predicate. A primitive event type $\Phi$ holds of an interval if the corresponding static predicate $\phi$ holds of every instant in that interval. This means that $\neg(\phi@i)$ and $\overline{\neg\phi}@i$ might have different truth values. For example, if $\phi$ is true of every instant in [0,2) and false of every other instant, then $\neg(\phi@[1,3))$ is true while $\overline{\neg\phi}@[1, 3)$ is false. Event logic takes coincidental occurrence to be a primitive notion. As will be demonstrated below, overlapping occurrence is a derived notion that can be expressed in terms of coincidental occurrence using compound event-logic expressions.

Two auxiliary notions are needed to define the syntax and semantics of event logic. First, there are thirteen possible relations between two intervals. These relations are denoted as =, <, >, m, mi, o, oi, s, si, f, fi, d, and di and referred to collectively as Allen relations throughout this disclosure. Second, the span of two intervals i and j, denoted SPAN (i,j), is defined as the smallest super-interval of both i and j.

The syntax of event logic is defined as follows. We are given finite disjoint sets of constant and variable symbols along with a finite set of primitive event-type symbols, each of a specified arity. Constant symbols, such as red-block and hand, denote objects while primitive event-type symbols, such as SUPPORTS, denote parameterized primitive event types. An atomic event-logic expression is a primitive event-type symbol of arity n applied to a sequence of n constants or variables. For example, SUPPORTS (green-block, x). An event-logic expression is either an atomic event-logic expression or one of the compound event-logic expressions $\neg\Phi$, $\Phi\vee\Psi$, $\forall x\Phi$, $\exists x\Phi$, $\Phi\wedge_R \Psi$, or $\Diamond_R\Phi$, where $\Phi$ and $\Psi$ are event-logic expressions, x is a variable, and $$R \subseteq \{=, <, >, m, mi, o, oi, s, si, f, fi, d, di\}.$$

Informally, the semantics of compound event-logic expressions is defined as follows:

$\neg\Phi$ denotes the non-occurrence of $\Phi$. An occurrence of $\neg\Phi$ coincides with i if no occurrence of $\Phi$ coincides with i. Note that $(\neg\Phi)@i$ could be true, even if an occurrence of $\Phi$ overlapped with i, so long as no occurrence of $\Phi$ coincided with i.

$\Phi\vee\Psi$ denotes the occurrence of either $\Phi$ or $\Psi$.

$\forall x\Phi$ denotes the simultaneous occurrence of $\Phi$ for all objects.

$\exists x\Phi$ denotes the occurrence of $\Phi$ for some object.

$\Phi\wedge_R \Psi$ denotes the occurrence of both $\Phi$ and $\Psi$. The occurrences of $\Phi$ and $\Psi$ need not be simultaneous. The subscript R specifies a set of allowed Allen relations between the occurrences of $\Phi$ and $\Psi$. If occurrences of $\Phi$ and $\Psi$ coincide with i and j respectively, and i r j for some r $\in$ R, then an occurrence of $\Phi\wedge_R \Psi$ coincides with the span of i and j. The special case $\Phi\wedge_{\{=\}} \Psi$ is abbreviated simply as $\Phi\wedge\Psi$ without any subscript. $\Phi\wedge\Psi$ describes an aggregate event where both $\Phi$ and $\Psi$ occur simultaneously. The special case $\Phi\wedge_{\{m\}} \Psi$ is also abbreviated as $(\Phi;\Psi$. $\Phi;\Psi$ describes an aggregate event where an occurrence of $\Phi$ is immediately followed by an occurrence of $\Psi$.

An occurrence of $\Diamond_R\Phi$ coinciding with i denotes an occurrence of $\Phi$ at some other interval j such that j r i for some r $\in$ R. $\Diamond_R$ can act as a tense operator. Expressions such as $\Diamond_{\{<\}}\Phi$, $\Diamond_{\{>\}}\Phi$, $\Diamond_{\{m\}}\Phi$, and $\Diamond_{\{mi\}}\Phi$ specify that $\Phi$ happened in the noncontiguous past, noncontiguous future, contiguous past, or contiguous future respectively. The $\Diamond_R$ operator can also be used to derive overlapped occurrence from coincidental occurrence. An occurrence of $\Diamond_{\{=, o, oi, s, si, f, fi, d, di\}}\Phi$ coincides with i if an occurrence of $\Phi$ overlaps with i. I abbreviate $\Diamond_{\{=, o, oi, s, si, f, fi, d, di\}}\Phi$ simply as $\Diamond\Phi$ without any subscript. Note that while $(\neg\Phi)@i$ indicates that no occurrence of $\Phi$ coincided with i, $(\neg\Diamond\Phi)@i$ indicates that no occurrence of $\Phi$ overlapped with i.

Formally, the truth of an atomic event-occurrence formula $\Phi@i$ is defined relative to a model. Let I be the set of all intervals. A model M is a triple <O,T,P>, where O is a set of objects, T is a map from constants and variables to objects from O, and P is map from primitive event-type symbols of arity n to subsets of $$I \times \underbrace{O \times ... \times O}_{n}.$$

P thus maps primitive event-type symbols to relations that take an interval as their first argument, in addition to the remaining object parameters. T[x:=o] denotes a map that is identical to T except that it maps the variable x to the object o. The semantics of event logic is formally defined by specifying an entailment relation $M \models \Phi@i$ as follows:

<O,T,P> $\models p(t_1, \ldots, t_n)@i$ if and only if <i, T(t_1), \ldots, T(t_n)> $\in$ P(p).

$M \models (\neg\Phi)@i$ if and only if $M \not\models \Phi@i$.

$M \models (\Phi\vee\Psi)@i$ if and only if $M \models \Phi@i$ or $M \models \Psi@i$.

$<O,T,P> \models (\forall x \Phi)@i$ if and only if $<O,T[x:=o],P> \models \Phi@i$ for every $o \in O$.

$<O,T,P> \models (\exists x \Phi)@i$ if and only if $<O,T[x:=o],P> \models \Phi@i$ for some $o \in O$.

$M \models (\Phi \wedge_R \Psi)@i$ if and only if there exist two intervals j and k such that i=SPAN (j, k), j r k for some $r \in R, M \models \Phi@j$, and $M \models \Psi@k$.

$M \models (\lozenge_R \Phi)@i$ if and only if there exists some interval j such that j r i for some $r \in R$ and $M \models \Phi@j$.

The overall goal of the event-classification component is to infer all occurrences of a given set of compound event types from a given set of primitive event occurrences. Let us define $\epsilon(M,\Phi)$ to be $\{i | M \models \Phi@i\}$. In principle, $\epsilon(M,\Phi)$ could by implemented as a straightforward application of the formal semantics for event logic as specified above. There is a difficulty in doing so, however. Primitive event types often have the property that they are liquid. Liquid events have the following two properties. First, if they are true during an interval i, then they are also true during any subinterval of i. Second, if they are true during two overlapping intervals i and j, then they are also true during SPAN(i,j). When primitive event types are liquid, they will hold over an infinite number of subintervals. This renders the formal semantics inappropriate for a computational implementation. Even if one limits oneself to intervals with integral endpoints, liquid primitive event types will hold over quadratically many subintervals of the scene sequence. And a straightforward computational implementation of the formal semantics would be inefficient. A central result of this disclosure is a novel representation, called spanning intervals, that allows an efficient representation of the infinite sets of subintervals over which liquid event types hold along with an efficient inference procedure that operates on that representation. This representation, and the inference procedure that implements $\epsilon(M,\Phi)$, are presented below.

SUMMARY OF THE INVENTION

Therefore it is an object of the present invention to provide a method for computing all occurrences of a compound event from occurrences of primitive events which overcomes the problems associated with the prior art methods.

Accordingly, a method for computing all occurrences of a compound event from occurrences of primitive events is provided where the compound event is a defined combination of the primitive events. The method comprises the steps of: (a) defining primitive event types; (b) defining combinations of the primitive event types as a compound event type; (c) inputting the primitive event occurrences, such occurrences being specified as the set of temporal intervals over which a given primitive event type is true; and (d) computing the compound event occurrences, such occurrences being specified as the set of temporal intervals over which the compound event type is true, where the set of temporal intervals in steps (c) and (d) are specified as smaller sets of spanning intervals, each spanning interval representing a set of intervals. Preferably, the spanning intervals take the form $_\alpha[_\gamma[i,j]_\delta, _\epsilon[k,l]_\zeta]_\beta$, where $\alpha, \beta, \gamma, \delta, \epsilon,$ and $\zeta$ are Boolean values, i, j, k, and l are real numbers, $_\alpha[_\gamma[i,j]_\delta, _\epsilon[k,l]_\zeta]_\beta$ represents the set of all intervals $_\alpha[p,q]_\beta$, where $i \leq_\gamma p \leq_\delta j$ and $k \leq_\epsilon q \leq_\zeta l$, $_\alpha[p,q]_\beta$ represents the set of all points r, where $p \leq_\alpha r \leq_\beta q$, and $x \leq_\theta y$ means $x \leq y$ when $\theta$ is true and $x<y$ when $\theta$ is false.

The methods of the present invention provide an efficient implementation of $\epsilon(M,\Phi)$ along with six subroutines used by $\epsilon(M,\Phi)$, namely $<i>, i_1 \cap i_2, \neg i$, SPAN$(i_1, i_2)$, $\mathcal{D}(r, i)$, and $\mathcal{J}(i,r,j)$.

Also provided are a computer program product for carrying out the methods of the present invention and a program storage device for the storage of the computer program product therein.

BRIEF DESCRIPTION OF THE DRAWINGS

These and other features, aspects, and advantages of the methods of the present invention will become better understood with regard to the following description, appended claims, and accompanying drawings where:

FIG. 3 illustrates the primitive event types used by the computer-system implementation of one application of the methods of the present invention as discussed in the "Example" section below;

FIG. 4 illustrates the lexicon of compound event types used by the computer-system implementation of one application of the methods of the present invention as discussed in the "Example" section below;

FIGS. 5A and 5B illustrate sequences of video frames depicting a pick up and put down event respectively, wherein the results of performing segmentation, tracking, and model reconstruction have been overlayed on the video frames;

FIGS. 6A and 6B illustrate the output of the event-classification methods of the present invention applied to the model sequences from FIGS. 5A and 5B, respectively;

FIGS. 7A, 7B, 7C, 7D, and 7E illustrate sequences of video frames depicting stack, unstack, move, assemble and disassemble events, wherein the results of performing segmentation, tracking, and model reconstruction have been overlayed on the video frames;

FIGS. 8A, 8B, 8C, 8D, and 8E illustrate the output of the event-classification methods of the present invention applied to the model sequences from FIGS. 7A, 7B, 7C, 7D, and 7E, respectively;

FIGS. 9A, 9B, 9C, and 9D illustrate sequences of video frames depicting: a pick up event from the left instead of from the right; a pick up event with extraneous objects in the field of view; a sequence of a pick up event followed by a put down event followed by another pick up event followed by another put down event; and two simultaneous pick up events, respectively, wherein the results of performing segmentation, tracking, and model reconstruction have been overlayed on the video frames;

FIGS. 10A, 10B, 10C, and 10D illustrate the output of the event-classification methods of the present invention applied to the model sequences from FIGS. 9A, 9B, 9C, and 9D, respectively;

FIGS. 11A and 11B illustrate sequences of video frames depicting non-events, wherein the results of performing segmentation, tracking, and model reconstruction have been overlayed on the video frames; and FIGS. 12A and 12B illustrate the output of the event-classification methods of the present invention applied to the model sequences from FIGS. 11A and 11B, respectively.

DETAILED DESCRIPTION OF THE PREFERRED EMBODIMENT

Figure 1:
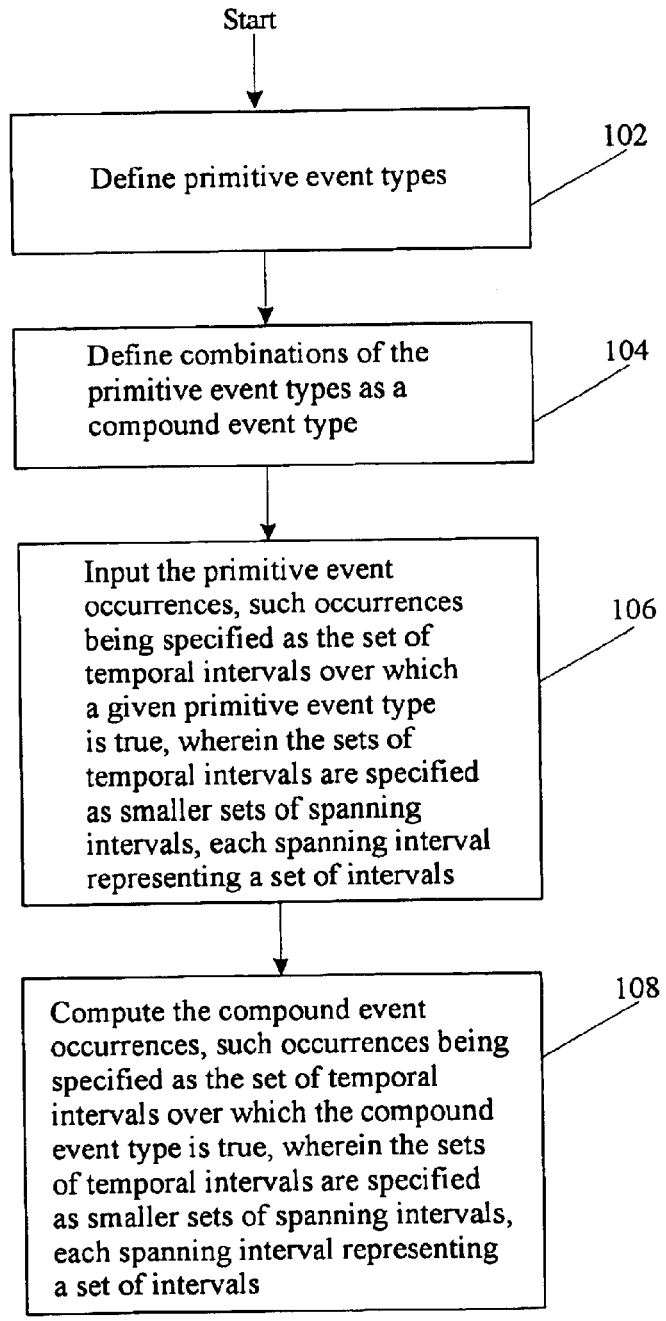
FIG. 1 illustrates a flowchart of a preferred implementation of the methods steps of the present invention.

Referring now to FIG. 1, there is illustrated a flowchart presenting a general overview of the method steps for computing all occurrences of a compound event from occurrences of primitive events, where the compound event is a defined combination of the primitive events. The method comprises defining primitive event types at step 102. At step 104 combinations of the primitive event types are defined as a compound event type. At step 106, the primitive event occurrences are input, such occurrences being specified as the set of temporal intervals over which a given primitive event type is true. Lastly, at step 108, the compound event occurrences are computed. Such occurrences being specified as the set of temporal intervals over which the compound event type is true, where, the set of temporal intervals in steps 106 and 108 are specified as smaller sets of spanning intervals, each spanning interval representing a set of intervals.

A detailed explanation of the general method steps in FIG. 1 will now be discussed.

Intervals

One might try to implement event logic using only closed intervals of the form [q,r], where q≤r. Such a closed interval would represent the set $\{p|q \leq p \leq r\}$ of real numbers. With such closed intervals, one would define the Allen relations as follows:

$$[q_1, r_1] = [q_2, r_2] \triangleq q_1 = q_2 \wedge r_1 = r_2$$

$$[q_1, r_1] < [q_2, r_2] \triangleq r_1 < q_2$$

$$[q_1, r_1] > [q_2, r_2] \triangleq q_1 > r_2$$

$$[q_1, r_1] m [q_2, r_2] \triangleq r_1 = q_2$$

$$[q_1, r_1] mi [q_2, r_2] \triangleq q_1 = r_2$$

$$[q_1, r_1] o [q_2, r_2] \triangleq q_1 < q_2 < r_1 < r_2$$

$$[q_1, r_1] oi [q_2, r_2] \triangleq r_1 > r_2 > q_1 > q_2$$

$$[q_1, r_1] s [q_2, r_2] \triangleq q_1 = q_2 \wedge r_1 < r_2$$

$$[q_1, r_1] si [q_2, r_2] \triangleq q_1 = q_2 \wedge r_1 > r_2$$

$$[q_1, r_1] f [q_2, r_2] \triangleq q_1 > q_2 \wedge r_1 = r_2$$

$$[q_1, r_1] fi [q_2, r_2] \triangleq q_1 < q_2 \wedge r_1 = r_2$$

$$[q_1, r_1] d [q_2, r_2] \triangleq q_1 > q_2 \wedge r_1 < r_2$$

$$[q_1, r_1] di [q_2, r_2] \triangleq q_1 < q_2 \wedge r_1 > r_2$$

One difficulty with doing so is that it would possible for more than one Allen relation to hold between two intervals when one or both of them are instantaneous intervals, such as [q, q]. Both m and s and would hold between [q, q] and [q, r], both mi and si would hold between [q, r] and [q, q], both m and fi would hold between [q, r] and [r, r], both mi and f would hold between [r, r] and [q, r], and =, m, and mi would all hold between [q, q] and itself. To create a domain where exactly one Allen relation holds between any pair of intervals, let us consider both open and closed intervals. The intervals (q, r], [q, r), and (q, r), where q<r, represent the sets $\{p|q<p \leq r\}$, $\{p|q \leq p<r\}$ and $\{p|q<p<r\}$ of real numbers respectively. The various kinds of open and closed intervals can be unified into a single representation $_\alpha[q,r]_\beta$, where $\alpha$ and $\beta$ are true or false to indicate the interval being closed or open on the left or right respectively. To do this, let us use $q \leq_\alpha r$ to mean q≤r when α is true and q<r when α is false. Similarly, let us use $q \geq_\alpha r$ to mean q≥r when α is true and q>r when α is false. With these, $_\alpha[q,r]_\beta$ represents the set $\{p|q \leq_\alpha p \leq_\beta r\}$ of real numbers. Given this, one can define the Allen relations as follows:

$$_{\alpha_1}[q_1, r_1]_{\beta_1} =_{\alpha_2} [q_2, r_2]_{\beta_2} \triangleq q_1 = q_2 \wedge \alpha_1 = \alpha_2 \wedge r_1 = r_2 \wedge \beta_1 = \beta_2 \quad (1)$$

$$_{\alpha_1}[q_1, r_1]_{\beta_1} <_{\alpha_2} [q_2, r_2]_{\beta_2} \triangleq r_1 \leq_{\neg \beta_1 \wedge \neg \alpha_2} q_2 \quad (2)$$

$$_{\alpha_1}[q_1, r_1]_{\beta_1} >_{\alpha_2} [q_2, r_2]_{\beta_2} \triangleq q_1 \geq_{\neg \alpha_1 \wedge \neg \beta_2} r_2 \quad (3)$$

$$_{\alpha_1}[q_1, r_1]_{\beta_1} m_{\alpha_2} [q_2, r_2]_{\beta_2} \triangleq r_1 = q_2 \wedge \beta_1 \neq \alpha_2 \quad (4)$$

$$_{\alpha_1}[q_1, r_1]_{\beta_1} mi_{\alpha_2} [q_2, r_2]_{\beta_2} \triangleq q_1 = r_2 \wedge \alpha_1 \neq \beta_2 \quad (5)$$

$$_{\alpha_1}[q_1, r_1]_{\beta_1} o_{\alpha_2} [q_2, r_2]_{\beta_2} \triangleq q_1 \leq_{\alpha_1 \wedge \neg \alpha_2} q_2 \leq_{\beta_1 \wedge \alpha_2} r_1 \leq_{\neg \beta_1 \wedge \beta_2} r_2 \quad (6)$$

$$_{\alpha_1}[q_1, r_1]_{\beta_1} oi_{\alpha_2} [q_2, r_2]_{\beta_2} \triangleq r_1 \geq_{\beta_1 \wedge \neg \beta_2} r_2 \geq_{\alpha_1 \wedge \beta_2} q_1 \geq_{\neg \alpha_1 \wedge \alpha_2} q_2 \quad (7)$$

$$_{\alpha_1}[q_1, r_1]_{\beta_1} s_{\alpha_2} [q_2, r_2]_{\beta_2} \triangleq q_1 = q_2 \wedge \alpha_1 = \alpha_2 \wedge r_1 \leq_{\neg \beta_1 \wedge \beta_2} r_2 \quad (8)$$

$$_{\alpha_1}[q_1, r_1]_{\beta_1} si_{\alpha_2} [q_2, r_2]_{\beta_2} \triangleq q_1 = q_2 \wedge \alpha_1 = \alpha_2 \wedge r_1 \geq_{\beta_1 \wedge \neg \beta_2} r_2 \quad (9)$$

$$_{\alpha_1}[q_1, r_1]_{\beta_1} f_{\alpha_2} [q_2, r_2]_{\beta_2} \triangleq q_1 \geq_{\neg \alpha_1 \wedge \alpha_2} q_2 \wedge r_1 = r_2 \wedge \beta_1 = \beta_2 \quad (10)$$

$$_{\alpha_1}[q_1, r_1]_{\beta_1} fi_{\alpha_2} [q_2, r_2]_{\beta_2} \triangleq q_1 \leq_{\alpha_1 \wedge \neg \alpha_2} q_2 \wedge r_1 = r_2 \wedge \beta_1 = \beta_2 \quad (11)$$

$$_{\alpha_1}[q_1, r_1]_{\beta_1} d_{\alpha_2} [q_2, r_2]_{\beta_2} \triangleq q_1 \geq_{\neg \alpha_1 \wedge \alpha_2} q_2 \wedge r_1 \leq_{\neg \beta_1 \wedge \beta_2} r_2 \quad (12)$$

$$_{\alpha_1}[q_1, r_1]_{\beta_1} di_{\alpha_2} [q_2, r_2]_{\beta_2} \triangleq q_1 \leq_{\alpha_1 \wedge \neg \alpha_2} q_2 \wedge r_1 \geq_{\beta_1 \wedge \neg \beta_2} r_2 \quad (13)$$

With the above definitions, exactly one Allen relation holds between any pair of intervals.

The set of real numbers represented by an interval is referred to as its extension. Given the above definition of interval, any interval, such as [5, 4], (5, 4], [5, 4), or (5, 4), where the upper endpoint is less than the lower endpoint represents the empty set. And any open interval, such as [5, 5), (5, 5], or (5, 5), where the upper endpoint equals the lower endpoint also represents the empty set. To create a situation where the extension of each interval has a unique representation, let us represent all such empty sets of real numbers as { }. Thus whenever we represent an interval $_\alpha[q,r]_\beta$ explicitly, it will have a nonempty extension and will satisfy the following normalization criterion: $q \leq_{\alpha \wedge \beta} r$.

Spanning Intervals

When using event logic, we wish to compute and represent the set I of all intervals over which some event-logic expression Φ holds. Many primitive event types, including all of the primitive events types used in the computer system implementation of the application described in the "Example" section below, are liquid in the sense that if some event holds of an interval then that event holds of every subinterval of that interval. With real-valued interval endpoints, this creates the need to compute and represent an infinite set of intervals for a liquid event. Even limiting ourselves to integer-valued interval endpoints, a liquid event will require the computation and representation of quadratically many intervals.

To address this problem, let us introduce the notion of a spanning interval. A spanning interval [i:j] represents the set of all subintervals of [i,j], in other words $\{[q,r]|i \leq q \leq j \wedge i \leq r \leq j\}$. Similarly (i:j], [i:j), and (i:j) represent $\{(q, r]|i \leq q \leq j \wedge i \leq r \leq j\}$, $\{[q,r)|i \leq q \leq j \wedge i \leq r \leq j\}$, and $\{(q,r)|i \leq q \leq j \wedge i \leq r \leq j\}$ respectively. What we desire is to use spanning intervals to represent the set of all intervals over which the primitive event types hold and to compute and represent the set of all intervals over which compound event types hold via structural induction over the compound event-logic expressions. A problem arises however. Given two liquid event types $\Phi$ and $\Psi$, the compound event type $\Phi; \Psi$ is not liquid. If $\Phi$ holds over [i:j) and $\Psi$ holds over [j:k), then $\Phi; \Psi$ might not hold over every subinterval of [i,k). It holds over only those subintervals that include j. Such event types are referred to as semi liquid. Since spanning intervals are not sufficient to efficiently represent semi-liquid events, let us extend the notion of a spanning interval. A spanning interval [[i,j], [k,l]] represents the set of intervals $\{[q,r] | i \leq q \leq j \wedge k \leq r \leq l\}$. Similarly the spanning intervals ([i,j],[k,l]], [[i,j],[k,l]), and ([i,j],[k,l]) represent the sets $\{(q,r] | i \leq q \leq j \wedge k \leq r \leq l\}$, $\{[q,r) | i \leq q \leq j \wedge k \leq r \leq l\}$, and $\{(q,r) | i \leq q \leq j \wedge k \leq r \leq l\}$ respectively. This extended notion of spanning interval subsumes the original notion. The spanning intervals [i:j], (i:j], [i:j), and (i:j) can be represented as the spanning intervals [[i,j],[i,j]], ([i,j],[i,j]], [[i,j],[i,j]), and ([i,j],[i,j]) respectively. For reasons that will become apparent below, it is necessary to also allow for spanning intervals where the ranges of endpoint values are open. In other words, we will need to consider spanning intervals like [(i,j],[k,l]] to represent sets like $\{[q,r] | i < q \leq j \wedge k \leq r \leq l\}$. All told, there are six endpoints that can independently be either open or closed: q, r, i, j, k, and l, yielding sixty four kinds of spanning intervals. These can all be unified into a single representation, $_\alpha[_\gamma[i,j]_\delta,_\epsilon[k,l]_\zeta]_\beta$, where $\alpha, \beta, \gamma, \delta, \epsilon$, and $\zeta$ are true or false if the endpoints q, r, i, j, k, and l are closed or open respectively. More precisely, the spanning interval $_\alpha[_\gamma[i,j]_\delta,_\epsilon[k,l]_\zeta]_\beta$ represents the set $$\{_\alpha[q,r]_\beta | i \leq_\gamma q \leq_\delta j \wedge k \leq_\epsilon r \leq_\zeta l\} \quad (14)$$

of intervals. The set of intervals represented by a spanning interval is referred to as its extension. Moreover, a set of spanning intervals will represent the union of the extensions of its members and the empty set of spanning intervals will represent the empty set of intervals. The set of intervals represented by a set of spanning intervals is further referred to as its extension. A key result of this disclosure is that if the set of all intervals over which some set of primitive event types hold can be represented as finite sets of spanning intervals then the set of all intervals over which all event types that are expressible as compound event-logic expressions over those primitives hold can also be represented as finite sets of spanning intervals.

Normalizing Spanning Intervals

While we require that all intervals have finite endpoints, we allow spanning intervals to have infinite endpoints, for instance, [[$-\infty$,j], [k,l]]. Such spanning intervals with infinite endpoints represent sets of intervals with finite endpoints but where the range of possible endpoints is unconstrained from above or below.

Just as we desire that the extension of every interval have a unique representation, we also desire that the extension of every spanning interval have a unique representation. There are a number of situations where two different spanning intervals will have the same extension. First, all spanning intervals $_\alpha[_\gamma[i,j]_\delta,_\epsilon[k,l]_\zeta]_\beta$, where i=$\infty$, j=$-\infty$, k=$\infty$, or l=$-\infty$ represent the empty set of intervals. Because there are no intervals with an endpoint that is less than or equal to minus infinity or greater than or equal to infinity. Second, if i=$-\infty$, j=$\infty$, k=$-\infty$, or l=$-\infty$, the value of $\gamma, \delta, \epsilon$, or $\zeta$ does not affect the denotation respectively. Because there are no intervals with infinite endpoints. Third, if j>l, j can be decreased as far as l without changing the denotation. Because all intervals where the upper endpoint is less than the lower endpoint equivalently denote the empty interval. Similarly, if k<i, k can be increased as far as i without changing the denotation. Fourth, all spanning intervals where i>j or k>l represent the empty set of intervals. Because the range of possible endpoints would be empty. Fifth, all spanning intervals where i=j and either $\gamma$ or $\delta$ is false (indicating an open range for the lower endpoint) represent the empty set of intervals. Because the range of possible endpoints would be empty. Similarly, all spanning intervals where k=l and either $\epsilon$ or $\zeta$ is false (indicating an open range for the upper endpoint) also represent the empty set of intervals. Sixth, all spanning intervals where i=l and either $\alpha$ or $\beta$ is false (indicating an open interval) also represent the empty set of intervals. Because the endpoints of an open interval must be different. Seventh, if j=l and $\zeta$ is false, the value of $\alpha$ does not affect the denotation. Because if j=l and $\zeta$ is false, the upper endpoint must be less than l and the lower endpoint must be less than or equal to j which equals l, so the lower endpoint must be less than j. Similarly, if k=i and $\gamma$ is false, the value of $\epsilon$ does not affect the denotation. Eighth, if j=l and either $\alpha$ or $\beta$ is false, the value of $\delta$ does not affect the denotation. Because the lower endpoint of an open interval must be less than its upper endpoint. Similarly, if k=i and either $\alpha$ or $\beta$ is false, the value of $\epsilon$ does not affect the denotation.

To create a situation where the extension of every spanning interval has a unique representation, let us represent all empty sets of intervals as { }. And when the values of i, j, k, l, $\alpha, \beta, \gamma, \delta, \epsilon$, or $\zeta$ can be changed without changing the denotation, we will select the tightest such values. In other words, false values for the Boolean parameters, maximal values for the lower bounds, and minimal values for the upper bounds. Thus whenever we represent a spanning interval $_\alpha[_\gamma[i,j]_\delta,_\epsilon[k,l]_\zeta]_\beta$ explicitly, it will have a nonempty extension and will satisfy the following normalization criterion:

(1) $i \neq \infty \wedge j \neq -\infty \wedge k \neq \infty \wedge l \neq -\infty \wedge$ (2) $(i=-\infty \rightarrow \neg\gamma) \wedge (j=\infty \rightarrow \neg\delta) \wedge (k=-\infty \rightarrow \neg\epsilon) \wedge (l=\infty \rightarrow \neg\zeta) \wedge$ (3) $j \leq l \wedge k \geq i \wedge$ (4) $i \leq j \wedge k \leq l \wedge$ (5) $(i \neq j \vee \gamma \wedge \delta) \wedge (k \neq l \vee \epsilon \wedge \zeta) \wedge$ (6) $(i \neq l \vee \alpha \wedge \beta) \wedge$ (7) $[(j=l \wedge \neg\zeta) \rightarrow \neg\delta] \wedge [(k=i \wedge \neg\gamma) \rightarrow \neg\epsilon] \wedge$ (8) $\{[j=l \wedge (\neg\alpha \vee \neg\beta)] \rightarrow \neg\delta\} \wedge \{[k=i \wedge (\neg\alpha \vee \neg\beta)] \rightarrow \neg\epsilon\}$ Criteria (1) through (8) correspond to points one through eight above.

A spanning interval $_\alpha[_\gamma[i,j]_\delta,_\epsilon[k,l]_\zeta]_\beta$ is normalized if i, j, k, l, $\alpha, \beta, \gamma, \delta, \epsilon$, and $\zeta$ cannot be changed without changing its denotation. Given a (potentially non-normalized) spanning interval i, its normalization <i> is the smallest set of normalized spanning intervals that represents the extension of i. One can compute <i> as follows:

$$\langle_\alpha[\gamma[i,j']_{\delta,\epsilon}[k,l]_\zeta]_\beta\rangle \triangleq$$

$$\begin{cases} \{_\alpha[\gamma[i,j']_{\delta',\epsilon'}]_\beta\} \\ \text{where } j' = \min(j,l) \\ \qquad k' = \max(k,i) \\ \qquad \gamma' = \gamma \wedge i \neq -\infty \\ \qquad \delta' = \delta \wedge \min(j,l) \neq \infty \wedge (j < l \vee \zeta \wedge \alpha \wedge \beta) \\ \qquad \epsilon' = \epsilon \wedge \max(k,i) \neq -\infty \wedge (k > i \vee \gamma \wedge \beta \wedge \alpha) \\ \qquad \zeta' = \zeta \wedge l \neq \infty \\ \text{when } i \leq j' \wedge k' \leq l \wedge \\ \qquad [i = j' \to (\gamma' \wedge \delta')] \wedge [k' = l \to (\epsilon' \wedge \zeta')] \wedge \\ \qquad [i = l \to (\alpha \wedge \beta)] \wedge \\ \qquad i \neq \infty \wedge j' \neq -\infty \wedge k' \neq \infty \wedge l \neq -\infty \\ \{\} \quad \text{otherwise} \end{cases}$$

An important property of spanning intervals is that for any spanning interval i, <i> contains at most one normalized spanning interval.

Computing the Intersection of Two Normalized Spanning Intervals

Given two normalized spanning intervals $i_1$ and $i_2$, their intersection $i_1 \cap i_2$ is a set of normalized spanning intervals whose extension is the intersection of the extensions of $i_1$ and $i_2$. One can compute $i_1 \cap i_2$ as follows:

$$\alpha_1[\gamma_1[i_1,j_1]_{\delta_1,\epsilon_1}[k_1,l_1]_{\zeta_1}]_{\beta_1} \cap \alpha_2[\gamma_2[i_2,j_2]_{\delta_2,\epsilon_2}[K_2,l_2]_{\zeta_2}]_{\beta_2} \triangleq$$
$$<_\alpha[\gamma[\max(i_1,i_2),\min(j_1,j_2)]_{\delta,\epsilon}[\max(k_1,k_2),\min(l_1,l_2)]_\zeta]_{\beta_1}>$$

where $\gamma = \begin{cases} \gamma_1 & i_1 > i_2 \\ \gamma_1 \wedge \gamma_2 & i_1 = i_2 \\ \gamma_2 & i_1 < i_2 \end{cases}$ $\delta = \begin{cases} \delta_1 & j_1 < j_2 \\ \delta_1 \wedge \delta_2 & j_1 = j_2 \\ \delta_2 & j_1 > j_2 \end{cases}$ $\epsilon = \begin{cases} \epsilon_1 & k_1 > k_2 \\ \epsilon_1 \wedge \epsilon_2 & k_1 = k_2 \\ \epsilon_2 & k_1 < k_2 \end{cases}$ $\zeta = \begin{cases} \zeta_1 & l_1 < l_2 \\ \zeta_1 \wedge \zeta_2 & l_1 = l_2 \\ \zeta_2 & l_1 > l_2 \end{cases}$ when $\alpha_1 = \alpha_2 \wedge \beta_1 = \beta_2$
{ } otherwise An important property of normalized spanning intervals is that for any two normalized spanning intervals $i_1$ and $i_2$, $i_1 \cap i_2$ contains at most one normalized spanning interval.

The intuition behind the above definition is as follows. All of the intervals in the extension of a spanning interval are of the same type, namely, [q,r], (q,r], [q,r), or (q,r). The intersection of two spanning intervals has a nonempty extension only if the two spanning intervals contain the same type of intervals in their extension. If they do, and the sets contain intervals whose lower endpoint is bound from below by $i_1$ and $i_2$ respectively, then the intersection will contain intervals whose lower endpoint is bound from below by both $i_1$ and $i_2$. The resulting bound is open or closed depending on which of the input bounds is tighter. Similarly for the upper bound on the lower endpoint and the lower and upper bounds on the upper endpoint.

Computing the Complement of a Normalized Spanning Interval

Given a normalized spanning interval i, its complement ¬i is a set of normalized spanning intervals whose extension is the complement of the extension of i. One can compute ¬i as follows:

$$\neg_\alpha[\gamma[i,j']_{\delta,\epsilon}[k,l]_\zeta]_\beta \triangleq \begin{cases} \langle_\alpha[\tau[-\infty,\infty]_{T,T}[-\infty,k]_{\neg\epsilon}]_\beta\rangle \cup \\ \langle_\alpha[\tau[-\infty,\infty]_{T,\neg\zeta}[l,\infty]_T]_\beta\rangle \cup \\ \langle_\alpha[\tau[-\infty,i]_{\neg\gamma,T}[-\infty,\infty]_T]_\beta\rangle \cup \\ \langle_\alpha[\neg\delta[j,\infty]_{T,T}[-\infty,\infty]_T]_\beta\rangle \cup \\ \langle_{\neg\alpha}[\tau[-\infty,\infty]_{T,T}[-\infty,\infty]_T]_\beta\rangle \cup \\ \langle_\alpha[\tau[-\infty,\infty]_{T,T}[-\infty,\infty]_T]_{\neg\beta}\rangle \cup \\ \langle_{\neg\alpha}[\tau[-\infty,\infty]_{T,T}[-\infty,\infty]_T]_{\neg\beta}\rangle \end{cases}$$

An important property of normalized spanning intervals is that for any normalized spanning interval i, ¬i contains at most seven normalized spanning intervals.

The intuition behind the above definition is as follows. First note that the negation of $q \leq_\alpha r$ is $q \geq_{\neg\alpha} r$. Next note that the extension of i contains intervals whose endpoints q and r satisfy $q \geq_\gamma i \wedge q \leq_\delta j \wedge r \geq_\epsilon k \wedge r \leq_\zeta l$. Thus the extension of ¬i contains intervals whose endpoints satisfy the negation of this, namely, $q \leq \neg\gamma i \vee q \geq \neg\delta j \vee r \leq \neg\epsilon k \vee r \leq \neg\zeta l$. Such a disjunction requires four spanning intervals, the first four in the above definition. Additionally, if the extension of i contains intervals of the form [q,r], the extension of ¬i will contain all intervals not of the form [q,r], namely, (q,r], [q,r), and (q,r). Similarly for the cases where the extension of i contains intervals of the form (q,r], [q,r), or (q,r). This accounts for the last three spanning intervals in the above definition.

We now see why it is necessary to allow spanning intervals to have open ranges of endpoint values. The complement of a spanning interval, such as [[i,j],[k,l]], with closed endpoint ranges, includes spanning intervals, such as [[−∞,i),[−∞,∞]], with open endpoint ranges.

Computing the Span of Two Normalized Spanning Intervals

The span of two intervals $i_1$ and $i_2$, denoted SPAN($i_1, i_2$), is the smallest interval whose extension contains the extensions of both $i_1$ and $i_2$. For example, the span of (1,4) and [2,6] is (1,6]. And the span of [3,7) and (3,7] is [3,7]. More generally, the lower endpoint of SPAN($i_1, i_2$) is the minimum of the lower endpoints of $i_1$ and $i_2$. And the lower endpoint of SPAN($i_1, i_2$) is open or closed depending on whether the smaller of the lower endpoints of $i_1$ and $i_2$ is open or closed. Analogously, the upper endpoint of SPAN($i_1, i_2$) is the maximum of the upper endpoints of $i_1$ and $i_2$. And the upper endpoint of SPAN($i_1, i_2$) is open or closed depending on whether the larger of the upper endpoints of $i_1$ and $i_2$ is open or closed. More precisely, SPAN($i_1, i_2$) can be computed as follows:

$$\text{SPAN}(_{\alpha_1}[q_1,r_1]_{\beta_1}, _{\alpha_2}[q_2,r_2]_{\beta_2})$$
$$\triangleq _{(\alpha_1 \wedge q_1 \leq q_2) \vee (\alpha_2 \wedge q_1 \geq q_2)}[\min(q_1,q_2),\max(r_1,r_2)]_{(\beta_1 \wedge r_1 \geq r_2) \vee (\beta_2 \wedge r_1 \leq r_2)}$$

The notion of span will be used below.

Let us extend the notion of span to two sets of intervals by the following definition:

$$\text{SPAN}(I_1, I_2) \triangleq \bigcup_{i_1 \in I_1} \bigcup_{i_2 \in I_2} \text{SPAN}(i_1, i_2)$$

We will want to compute the span of two sets of intervals $I_1$ and $I_2$, when both $I_1$ and $I_2$ are represented as spanning intervals. And we will also want the resulting span to be represented as a small set of spanning intervals.

Given two normalized spanning intervals $i_1$ and $i_2$, their span $\text{SPAN}(i_1, i_2)$ is a set of normalized spanning intervals whose extension is the span of the extensions of $i_1$ and $i_2$. One can compute $\text{SPAN}(i_1, i_2)$ as follows:

$$\text{SPAN}\left(_{\alpha_1}[_{\gamma_1}[i_1, j_1]_{\delta_1,\epsilon_1}[k_1, l_1]_{\zeta_1}]_{\beta_1},_{\alpha_2}[_{\gamma_2}[i_2, j_2]_{\delta_2,\epsilon_2}[k_2, l_2]_{\zeta_2}]_{\beta_2}\right) \triangleq$$

$$\begin{pmatrix} \langle_{\alpha_1}[_{\gamma_1}[i_1, j]_{\delta,\epsilon}[k, l_1]_{\zeta_1}]_{\beta_1}\rangle \cup \\ \langle_{\alpha_1}[_{\gamma_1}[i_1, j]_{\delta,\epsilon}[k, l_2]_{\zeta_2}]_{\beta_2}\rangle \cup \\ \langle_{\alpha_2}[_{\gamma_2}[i_2, j]_{\delta,\epsilon}[k, l_1]_{\zeta_1}]_{\beta_1}\rangle \cup \\ \langle_{\alpha_2}[_{\gamma_2}[i_2, j]_{\delta,\epsilon}[k, l_2]_{\zeta_2}]_{\beta_2}\rangle \end{pmatrix}$$

where $j = \min(j_1, j_2)$ $k = \max(k_1, k_2)$ $\delta = [(\delta_1 \wedge j_1 \leq j_2) \vee (\delta_2 \wedge j_1 \geq j_2)]$ $\epsilon = [(\epsilon_1 \wedge k_1 \geq k_2) \vee (\epsilon_2 \wedge k_1 \leq k_2)]$ An important property of normalized spanning intervals is that for any two normalized spanning intervals $i_1$ and $i_2$, $\text{SPAN}(i_1, i_2)$ contains at most four normalized spanning intervals. In practice, however, fewer normalized spanning intervals are needed, often only one.

The intuition behind the above definition is as follows. Consider first the lower endpoint. Suppose that the lower endpoints $q_1$ and $q_2$ of $i_1$ and $i_2$ are in $_{\gamma_1}[i_1,j_1]_{\delta_1}$ and $_{\gamma_2}[i_2,j_2]_{\delta_1}$ respectively. That means $i \leq_{\gamma_1} q_1 \leq_{\delta_1} j_1$ and $i_2 \leq_{\gamma_2} q_2 \leq_{\delta_2} j_2$. The lower endpoint of $\text{SPAN}(i_1, i_2)$ will be $q_1$, when $q_1 \leq q_2$, and $q_2$, when $q_2 \leq q_1$. Thus it will be $q_1$, for all $i_1 \leq_{\gamma_1} q_1 \leq_\delta \min(j_1, j_2)$, and will be $q_2$, for all $i_2 \leq_{\gamma_2} q_2 \leq_\delta \min(j_1, j_2)$, where $\delta = \delta_1$, when $j_1 \leq j_2$, and $\delta = \delta_2$, when $j_1 \geq j_2$. Thus there will be two potential ranges for the lower endpoint of $\text{SPAN}(i_1, i_2)$: $_{\gamma_1}[i_1, \min(j_1,j_2)]_\delta$ and $_{\gamma_2}[i_2, \min(j_1,j_2)]_\delta$. When the lower endpoint of $\text{SPAN}(i_1, i_2)$ is taken from the former, it will be open or closed depending on whether the lower endpoint of $i_1$ is open or closed. When it is taken from the later, it will be open or closed depending on whether the lower endpoint of $i_2$ is open or closed. Thus the lower endpoint of $\text{SPAN}(i_1, i_2)$ can be either $_{\alpha_1}[_{\gamma_1}[i_1, \min(j_1,j_2)]_\delta$ or $_{\alpha_1}[_{\gamma_2}[i_2, \min(j_1,j_2)]_\delta$. Analogous reasoning can be applied to the upper endpoints. If the upper endpoints of $i_1$ and $i_2$ are $_{\epsilon_1}[k_1,l_1]_{\zeta_1}]_{\beta_1}$ and $_{\epsilon_2}[k_2,l_2]_{\zeta_2}]_{\beta_2}$ respectively, then there are two possibilities for the upper endpoint of $\text{SPAN}(i_1, i_2)$, namely, $_\epsilon[\max(k_1,k_2), l_1]_{\zeta_1}]_{\beta_1}$ and $_\epsilon[\max(k_1,k_2),l_2]_{\zeta_2}]_{\beta_2}$, where $\epsilon = \epsilon_1$, when $k_1 \geq k_2$, and $\epsilon = \epsilon_2$, when $k_1 \leq k_2$.

Computing the $\mathcal{D}$ of a Normalized Spanning Interval

Given an Allen relation r and a set I of intervals, let $\mathcal{D}(r,I)$ denote the set J of all intervals j such that irj for some i∈I. Given an Allen relation r and a normalized spanning interval i, let $\mathcal{D}(r,i)$ denote a set of normalized spanning intervals whose extension is $\mathcal{D}(r,I)$, where I is the extension of i. One can compute $\mathcal{D}(r,i)$ as follows:

$$\mathcal{D}(= i) \triangleq \{i\}$$

$$\mathcal{D}\left(<,_{\alpha_1}[_{\gamma_1}[i_1, j_1]_{\delta_1,\epsilon_1}[k_1, l_1]_{\zeta_1}]_{\beta_1}\right) \triangleq \bigcup_{\alpha_2,\beta_2 \in \{T,F\}} \langle_{\alpha_2}[_{\neg\beta_1 \wedge \neg\alpha_2 \wedge \epsilon_1}[k_1, \infty]_{T,T}[-\infty, \infty]_T]_{\beta_2}\rangle$$

$$\mathcal{D}\left(>,_{\alpha_1}[_{\gamma_1}[i_1, j_1]_{\delta_1,\epsilon_1}[k_1, l_1]_{\zeta_1}]_{\beta_1}\right) \triangleq \bigcup_{\alpha_2,\beta_2 \in \{T,F\}} \langle_{\alpha_2}[_T[-\infty, \infty]_{T,T}[-\infty, j_1]_{\neg\alpha_1 \wedge \neg\beta_2 \wedge \delta_1}]_{\beta_2}\rangle$$

$$\mathcal{D}\left(m,_{\alpha_1}[_{\gamma_1}[i_1, j_1]_{\delta_1,\epsilon_1}[k_1, l_1]_{\zeta_1}]_{\beta_1}\right) \triangleq \bigcup_{\beta_2 \in \{T,F\}} \langle_{\neg\beta_1}[_{\epsilon_1}[k_1, l_1]_{\zeta_1,T}[-\infty, \infty]_T]_{\beta_2}\rangle$$

$$\mathcal{D}\left(mi,_{\alpha_1}[_{\gamma_1}[i_1, j_1]_{\delta_1,\epsilon_1}[k_1, l_1]_{\zeta_1}]_{\beta_1}\right) \triangleq \bigcup_{\alpha_2 \in \{T,F\}} \langle_{\alpha_2}[_T[-\infty, \infty]_{T,\gamma_1}[i_1, j_1]_{\delta_1}]_{\neg\alpha_1}\rangle$$

$$\mathcal{D}\left(o,_{\alpha_1}[_{\gamma_1}[i_1, j_1]_{\delta_1,\epsilon_1}[k_1, l_1]_{\zeta_1}]_{\beta_1}\right) \triangleq \bigcup_{\alpha_2,\beta_2 \in \{T,F\}} \langle_{\alpha_2}[_{\alpha_1 \wedge \neg\alpha_2 \wedge \gamma_1}[i_1, l_1]_{\beta_1 \wedge \alpha_2 \wedge \zeta_1, \neg\beta_1 \wedge \beta_2 \wedge \epsilon_1}[k_1, \infty]_T]_{\beta_2}\rangle$$

$$\mathcal{D}\left(oi,_{\alpha_1}[_{\gamma_1}[i_1, j_1]_{\delta_1,\epsilon_1}[k_1, l_1]_{\zeta_1}]_{\beta_1}\right) \triangleq \bigcup_{\alpha_2 \in \{T,F\}} \langle_{\alpha_2}[_T[-\infty, j_1]_{\neg\alpha_1 \wedge \alpha_2 \wedge \delta_1, \alpha_1 \wedge \beta_2 \wedge \gamma_1}[i_1, l_1]_{\beta_1 \wedge \neg\beta_2 \wedge \zeta_1}]_{\beta_2}\rangle$$

$$\mathcal{D}\left(s,_{\alpha_1}[_{\gamma_1}[i_1, j_1]_{\delta_1,\epsilon_1}[k_1, l_1]_{\zeta_1}]_{\beta_1}\right) \triangleq \bigcup_{\beta_2 \in \{T,F\}} \langle_{\alpha_1}[_{\gamma_1}[i_1, j_1]_{\delta_1, \neg\beta_1 \wedge \beta_2 \wedge \epsilon_1}[k_1, \infty]_T]_{\beta_2}\rangle$$

$$\mathcal{D}\left(si,_{\alpha_1}[_{\gamma_1}[i_1, j_1]_{\delta_1,\epsilon_1}[k_1, l_1]_{\zeta_1}]_{\beta_1}\right) \triangleq \bigcup_{\beta_2 \in \{T,F\}} \langle_{\alpha_1}[_{\gamma_1}[i_1, j_1]_{\delta_1}, T[-\infty, l_1]_{\beta_1 \wedge \neg\beta_2 \wedge \zeta_1}]_{\beta_2}\rangle$$

$$\mathcal{D}\left(f,_{\alpha_1}[_{\gamma_1}[i_1, j_1]_{\delta_1,\epsilon_1}[k_1, l_1]_{\zeta_1}]_{\beta_1}\right) \triangleq \bigcup_{\alpha_2 \in \{T,F\}} \langle_{\alpha_2}[_T[-\infty, j_1]_{\neg\alpha_1 \wedge \alpha_2 \wedge \delta_1, \epsilon_1}[k_1, l_1]_{\zeta_1}]_{\beta_1}\rangle$$

-continued $$\mathcal{D}\left(fi_{\cdot\alpha_1}\left[\gamma_1[i_1,j_1]_{\delta_1,\epsilon_1}[k_1,l_1]_{\zeta_1}\right]_{\beta_1}\right) \triangleq \bigcup_{\alpha_2 \in \{T,F\}} \left\langle \alpha_2[\alpha_1 \wedge \neg \alpha_2 \wedge \gamma_1[i_1,\infty]_{T,\epsilon_1}\ [k_1,l_1]_{\zeta_1}\right]_{\beta_1}\right\rangle$$

$$\mathcal{D}\left(d_{\cdot\alpha_1}\left[\gamma_1[i_1,j_1]_{\delta_1,\epsilon_1}[k_1,l_1]_{\zeta_1}\right]_{\beta_1}\right) \triangleq \bigcup_{\alpha_2,\beta_2 \in \{T,F\}} \left\langle \alpha_2[T[-\infty,j_1]_{\neg\alpha_1 \wedge \alpha_2 \wedge \delta_1,\neg\beta_1 \wedge \beta_2 \wedge \epsilon_1}\ [k_1,\infty]_T\right]_{\beta_2}\right\rangle$$

$$\mathcal{D}\left(di_{\cdot\alpha_1}\left[\gamma_1[i_1,j_1]_{\delta_1,\epsilon_1}[k_1,l_1]_{\zeta_1}\right]_{\beta_1}\right) \triangleq \bigcup_{\alpha_2,\beta_2 \in \{T,F\}} \left\langle \alpha_2[\alpha_1 \wedge \neg \alpha_2 \wedge \gamma_1[i_1,\infty]_{T,T}[-\infty,l_1]_{\beta_1 \wedge \neg \beta_2 \wedge \zeta_1}\right]_{\beta_2}\right\rangle$$

An important property of normalized spanning intervals is that for any normalized spanning interval i, $\mathcal{D}(r,i)$ contains at most 1, 4, 4, 2, 2, 4, 4, 2, 2, 2, 2, 4, or 4 normalized spanning intervals when r is =, <, >, m, mi, o, oi, s, si, f, fi, d, or di respectively. In practice, however, fewer normalized spanning intervals are needed, often only one.

The intuition behind the above definition is as follows. Let us handle each of the cases separately.

r=< For any intervals $i'_1$ and $i'_2$ in the extensions of $i_1$ and $i_2$ respectively we want $i'_1 < i'_2$. From (2) we get $r_1 \leq \neg\beta_1 \wedge \neg\alpha_2 q_2$. And from (14) we get $k_1 \leq_{\epsilon_1} r_1$. Combining these we get $k_1 \leq \neg\beta_1 \wedge \neg\alpha_2 \wedge \epsilon_1 q_2$. In this case, both $\alpha_2$ and $\beta_2$ are free indicating that either endpoint of $i'_2$ can be open or closed.

r=> For any intervals $i'_1$ and $i'_2$ in the extensions of $i_1$ and $i_2$ respectively we want $i'_1 > i'_2$. From (3) we get $q_1 \geq \neg\alpha_1 \wedge \neg\beta_2 r_2$. And from (14) we get $q_1 \leq_{\delta_1} j_1$. Combining these we get $r_2 \leq \neg\alpha_1 \wedge \neg\beta_2 \wedge \delta_1 j_1$. In this case, both $\alpha_2$ and $\beta_2$ are free indicating that either endpoint of $i'_2$ can be open or closed.

r=m For any intervals $i'_1$ and $i'_2$ in the extensions of $i_1$ and $i_2$ respectively we want $i'_1 \, m \, i'_2$. From (4) we get $r_1 = q_2$ and $\beta_1 \neq \alpha_2$. And from (14) we get $k_1 \leq_{\epsilon_1} r_1 \leq_{\zeta_1} l_1$. Combining these we get $k_1 \leq_{\epsilon_1} q_2 \leq_{\zeta_1} l_1$ and $\beta_1 \neq \alpha_2$. In this case, only $\beta_2$ is free indicating that the upper endpoint of $i'_2$ can be open or closed.

r=mi For any intervals $i'_1$ and $i'_2$ in the extensions of $i_1$ and $i_2$ respectively we want $i'_1 \, mi \, i'_2$. From (5) we get $q_1 = r_2$ and $\alpha_1 \neq \beta_2$. And from (14) we get $i_1 \leq_{\gamma_1} q_1 \leq_{\delta_1} j_1$. Combining these we get $i_1 \leq_{\gamma_1} r_2 \leq_{\delta_1} j_1$ and $\alpha_1 \neq \beta_2$. In this case, only $\alpha_2$ is free indicating that the lower endpoint of $i'_2$ can be open or closed.

r=o For any intervals $i'_1$ and $i'_2$ in the extensions of $i_1$ and $i_2$ respectively we want $i'_1 \, oi'_2$. From (6) we get $q_1 \leq_{\alpha_1} \neg\alpha_2 q_2 \leq_{\beta_1} \wedge \alpha_2 r_1 \leq \neg\beta_1 \wedge \beta_2 r_2$. And from (14) we get $i_1 \leq_{\gamma_1} q_1$ and $k_1 \leq_{\epsilon_1} r_1 \leq_{\zeta_1} l_1$. Combining these we get $i_1 \leq_{\alpha_1} \neg\alpha_2 \wedge \gamma_1 q_2 \leq_{\beta_1} \wedge \alpha_2 \wedge \zeta_1 l_1$ and $k_1 \leq \neg\beta_1 \wedge \beta_2 \wedge \epsilon_1 r_2$. In this case, both $\alpha_2$ and $\beta_2$ are free indicating that either endpoint of $i'_2$ can be open or closed.

r=oi For any intervals $i'_1$ and $i'_2$ in the extensions of $i_1$ and $i_2$ respectively we want $i'_1 \, oii'_2$. From (7) we get $q_2 \leq \neg\alpha_1 \wedge \alpha_2 q_1 \leq_{\alpha_1} \wedge \beta_2 r_2 \leq_{\beta_1} \wedge \neg\beta_2 r_1$. And from (14) we get $r_1 \leq_{\zeta_1} l_1$ and $i_1 \leq_{\gamma_1} q_1 \leq_{\delta_1} j_1$. Combining these we get $i_1 \leq_{\alpha_1} \wedge \beta_2 \wedge \gamma_1 r_2 \leq_{\beta_1} \wedge \neg\beta_2 \wedge \zeta_1 l_1$ and $q_2 \leq \neg\alpha_1 \wedge \alpha_2 \wedge \delta_1 j_1$. In this case, both $\alpha_2$ and $\beta_2$ are free indicating that either endpoint of $i'_2$ can be open or closed.

r=s For any intervals $i'_1$ and $i'_2$ in the extensions of $i_1$ and $i_2$ respectively we want $i'_1 \, si'_2$. From (8) we get $q_1 = q_2$, $\alpha_1 = \alpha_2$, and $r_1 \leq \neg\beta_1 \wedge \beta_2 r_2$. And for (14) we get $i_1 \leq_{\gamma_1} q_1 \leq_{\delta_1} j_1$ and $k_1 \leq_{\epsilon_1} r_1$. Combining these we get $\alpha_1 = \alpha_2$. $i_1 \leq_{\gamma_1} q_2 \leq_{\delta_1} j_1$, and $k_1 \leq \neg\beta_1 \wedge \beta_2 \wedge \epsilon_1 r_2$. In this case, only $\beta_2$ is free indicating that the upper endpoint of $i'_2$ can be open or closed.

r=si For any intervals $i'_1$ and $i'_2$ in the extensions of $i_1$ and $i_2$ respectively we want $i'_1 \, si \, i'_2$. From (9) we get $q_1 = q_2$, $\alpha_1 = \alpha_2$, and $r_1 \geq_{\beta_1} \wedge \neg\beta_2 r_2$. And from (14) we get $i_1 \leq_{\gamma_1} q_1 \leq_{\delta_1} j_1$ and $r_1 \leq_{\zeta_1} l_1$. Combining these we get $\alpha_1 = \alpha_2$, $i_1 \leq_{\gamma_1} q_2 \leq_{\delta_1} j_1$, and $r_2 \leq_{\beta_1} \wedge \neg\beta_2 \wedge \zeta_1 l_1$. In this case, only $\beta_2$ is free indicating that the upper endpoint of $i'_2$ can be open or closed.

r=f For any intervals $i'_1$ and $i'_2$ in the extensions of $i_1$ and $i_2$ respectively we want $i'_1 \, f \, i'_2$. From (10) we get $q_1 \geq \neg\alpha_1 \wedge \alpha_2 q_2$, $r_1 = r_2$, and $\beta_1 = \beta_2$. And from (14) we get $k_1 \leq_{\epsilon_1} r_1 \leq_{\zeta_1} l_1$ and $q_1 \leq_{\delta_1} j_1$. Combining these we get $\beta_1 = \beta_2$, $k_1 \leq_{\epsilon_1} r_2 \leq_{\zeta_1} l_1$, and $q_2 \leq \neg\alpha_1 \wedge \alpha_2 \wedge \delta_1 j_1$. In this case, only $\alpha_2$ is free indicating that the lower endpoint of $i'_2$ can be open or closed.

r=fi For any intervals $i'_1$ and $i'_2$ in the extensions of $i_1$ and $i_2$ respectively we want $i'_1 \, fi \, i'_2$. From (11) we get $q_1 \geq_{\alpha_1} \wedge \neg\alpha_2 q_2$, $r_1 = r_2$, and $\beta_1 = \beta_2$. And form (14) we get $k_1 \leq_{\epsilon_1} r_1 \leq_{\zeta_1} l_1$ and $i_1 \leq_{\gamma_1} q_1$. Combining these we get $\beta_1 = \beta_2$, $k_1 \leq_{\epsilon_1} r_2 \leq_{\zeta_1} l_1$, and $i_1 \leq_{\alpha_1} \wedge \neg\alpha_2 \wedge \gamma_1 q_2$. In this case, only $\alpha_2$ is free indicating that the lower endpoint of $i'_2$ can be open or closed.

r=d For any intervals $i'_1$ and $i'_2$ in the extensions of $i_1$ and $i_2$ respectively we want $i'_1 \, di'_2$. From (12) we get $q_1 \geq \neg\alpha_1 \wedge \alpha_2 q_2$ and $r_1 \leq \neg\beta_2 \wedge \beta_2 r_2$. And from (14) we get $q_1 \leq_{\delta_1} j_1$ and $k_1 \leq_{\epsilon_1} r_1$. Combining these we get $q_2 \leq \neg\alpha_1 \wedge \alpha_2 \wedge \delta_1 j_1$ and $k_1 \leq \neg\beta_1 \wedge \beta_2 \wedge \epsilon_1 r_2$. In this case, both $\alpha_2$ and $\beta_2$ are free indicating that either endpoint of $i'_2$ can be open or closed.

r=di For any intervals $i'_1$ and $i'_2$ in the extensions of $i_1$ and $i_2$ respectively we want $i'_1 \, di \, i'_2$. From (13) we get $q_1 \leq_{\alpha_1} \wedge \neg\alpha_2 q_2$, and $r_1 \geq_{\beta_1} \wedge \neg\beta_2 r_2$. And from (14) we get $i_1 \leq_{\gamma_1} q_1$ and $r_1 \leq_{\zeta_1} l_1$. Combining these we get $i_1 \leq_{\alpha_1} \wedge \neg\alpha_2 \wedge \gamma_1 q_2$ and $r_2 \leq_{\beta_1} \wedge \neg\beta_2 \wedge \zeta_1 l_1$. In this case, both $\alpha_2$ and $\beta_2$ are free indicating that either endpoint of $i'_2$ can be open or closed.

Computing the $\mathcal{J}$ of Two Normalized Spanning Intervals

Given an Allen relation r and two sets I and J of intervals, let $\mathcal{J}(I,r,J)$ denote the set K of all intervals k such that k=SPAN(i,j) for some i∈I and j∈J, where irj. Given an Allen relation r and two normalized spanning intervals i and j, let $\mathcal{J}(i,r,j)$ denote a set of normalized spanning intervals whose extension is $\mathcal{J}(I,r,J)$, where I and J are the extensions of i and j respectively. One can compute $\mathcal{J}(i,r,j)$ as follows:

$$\mathcal{J}(i,r,j) \triangleq \bigcup_{i' \in \mathcal{D}(r^{-1},j)} \bigcup_{i'' \in i'\cap i} \bigcup_{j' \in \mathcal{D}(r,i)} \bigcup_{j'' \in j' \cap j} \text{SPAN}(i'',j'')$$

It is easy to see that $|\mathcal{J}(\cdot,r,\cdot)| \leq 4|\mathcal{D}(r,\cdot)|^2$. Thus an important property of normalized spanning intervals is that for any two normalized spanning intervals i and j, $\mathcal{J}(i,r,j)$ contains at most 4, 64, 64, 16, 16, 64, 64, 16, 16, 16, 16, 64, or 64 normalized spanning intervals, when r is =, <, >, m, mi, o, oi, s, si, f, fi, d, or di respectively. While simple combinatorial enumeration yields the above weak bounds on the number of normalized spanning intervals needed to represent $\mathcal{J}(i,r,j)$, in practice, far fewer normalized spanning intervals are needed, in most cases only one.

The intuition behind the above definition is as follows. Let I and J be the extensions of i and j respectively. The extension of the set of all i' is the set of all intervals i such that irj for some j in J. And the extension of the set of all i" is the set of all intervals i in I such that irj for some j in J. Similarly, the extension of the set of all j' is the set of all intervals j such that irj for some i in I. And the extension of the set of all j" is the set of all intervals j in J such that irj for some i in I. Thus the extension of the set of all SPAN(i"j") is the set of all intervals k such that k=SPAN(i,j) where i is in I, j is in J, and irj.

An Efficient Inference Procedure for Event Logic

Given the above procedures for computing $<i>$, $i_1 \cap i_2$, $\neg i$, SPAN($i_1$, $i_2$), $\mathcal{D}(r, i)$, and $\mathcal{J}(i,r,j)$, one can now define a procedure for computing $\epsilon(M,\Phi)$. This procedure takes a model M along with an event-logic expression $\Phi$ and computes a set of normalized spanning intervals that represents the set I of intervals i for which $\Phi@i$ is true. The model M is a set of atomic event-occurrence formulae of the form $p(c_1, \ldots, c_n)@i$, where $p(c_1, \ldots, c_n)$ is a ground primitive event-logic expression and i is a normalized spanning interval. A model entry $p(c_1, \ldots, c_n)@i$ indicates that the primitive event $p(c_1, \ldots, c_n)$ occurred during all intervals in the extension of i. C(M) denotes the set of all constants in all ground primitive event-logic expressions in M.

$$\varepsilon(M, p(c_1, \ldots, c_n)) \triangleq \{i \mid p(c_1, \ldots, c_n)@i \in M\}$$

$$\varepsilon(M, \Phi \vee \Psi) \triangleq \varepsilon(M, \Phi) \cup \varepsilon(M, \Psi)$$

$$\varepsilon(M, \forall x \Phi) \triangleq \bigcup_{i_1 \in \varepsilon(M,\Phi[x:=c_1])} \ldots \bigcup_{i_n \in \varepsilon(M,\Phi[x:=c_n])} i_1 \cap \ldots \cap i_n$$

where $C(M) = \{c_1, \ldots, c_n\}$ $$\varepsilon(M, \exists x \Phi) \triangleq \bigcup_{c \in C(M)} \varepsilon(M, \Phi[x := c])$$

$$\varepsilon(M, \neg \Phi) \triangleq \bigcup_{i'_1 \in \neg i_1} \ldots \bigcup_{i'_n \in \neg i_n} i'_1 \cap \ldots \cap i'_n$$

where $\varepsilon(M, \Phi) = \{i_1, \ldots, i_n\}$ $$\varepsilon(M, \Phi \wedge_R \Psi) \triangleq \bigcup_{i \in \varepsilon(M,\Phi)} \bigcup_{j \in \varepsilon(M,\Psi)} \bigcup_{r \in R} \mathcal{J}(i, r, j)$$

$$\varepsilon(M, \diamond_R \Phi) \triangleq \bigcup_{i \in \varepsilon(M,\Phi)} \bigcup_{r \in R} \mathcal{D}(r, i)$$

Figure 2:
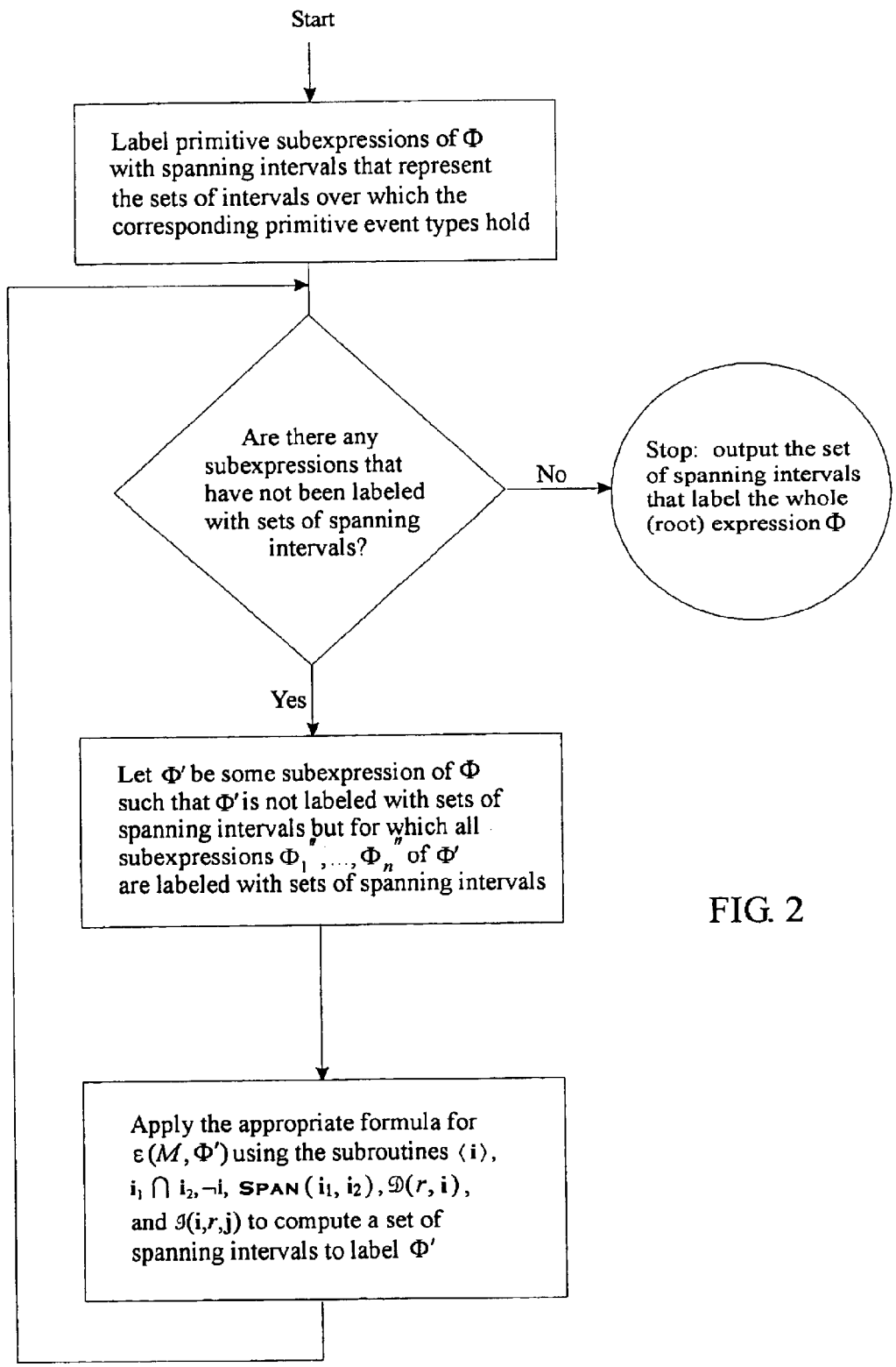
FIG. 2 illustrates a flowchart of the structural induction process used to implement step 108 of FIG. 1.

The procedure performs structural induction on $\Phi$ as set forth in more detail in FIG. 2. It computes a set of normalized spanning intervals to the represent the occurrence of each atomic event-logic expression in $\Phi$ and recursively combines the sets so computed for each child subexpression to yield the sets for each parent subexpression. An important property of this inference procedure is that for any finite model M, $\epsilon(M,\Phi)$, the set I of intervals i for which $\Phi@i$ is true, can be represented by a finite set of normalized spanning intervals. Nominally, the number of normalized spanning intervals in $\epsilon(M,\Phi)$ can be exponential in the subexpression depth of $\Phi$ because each step in the structural induction can introduce a constant factor growth in the size of the set. However, in practice, such exponential growth does not occur.

EXAMPLE

The methods of the present invention have been implemented as a computer system for recognizing events in video sequences. However, the recognition of events in video sequences is given by way of example only and not to limit the scope or spirit of the present invention. Those skilled in the art will realize that there are many other applications for the methods of the present invention.

The computer system takes short (typically 30 to 120 frame) video sequences as input. These video sequences depict a person performing various actions with colored blocks, such as pick up, put down, stack, unstack, move, assemble, and disassemble. A video sequence can depict no defined action, one defined action, or multiple defined actions. Multiple defined actions may be sequential and/or simultaneous and may be the same action or different actions. The computer system labels each video sequence with the actions that are being performed as well as the particular interval in the video sequence during which those actions were performed.

This computer system uses the methods of the present invention to perform event classification. FIG. 3 shows the primitive event types used by this computer system. The intervals in the input video sequences during which these primitive event types hold are computed using techniques in the prior art. These intervals, however, are represented as spanning intervals introduced by the present invention. This specification of the primitive event types and the mechanism for computing the intervals corresponding to their occurrence in input video sequences constitutes an application of steps 102 and 106 as shown in FIG. 1. FIG. 4 shows the compound event types used by this computer system. These compound event types are specified as event-logic expressions over the primitive event types from FIG. 3. This specification of the compound event types constitutes an application of step 104 as shown in FIG. 1.

PICKUP (x, y, z) denotes an event type where x picks y up off of z. It is specified as a sequence of three intervals, where x is not attached to and does not support y in the first interval but is attached to and does support y in the third interval. And z supports y in the first interval but does not support y in the third interval. Additionally, several conditions must hold in both the first and third intervals: x must be unsupported, y must not support either z or x, x and z must not support each other, and y must not be attached to z. During the second interval, intermediate between the first and third intervals, either x is attached to y or y is attached to z. Additionally, several conditions must hold throughout the entire event: x, y, and z must be distinct and y must be supported. PUTDOWN (x, y, z) denotes an event type where x puts y down on z. It is specified in a fashion that is similar to PICKUP (x, y, z) but where the three subevents occur in reverse order. STACK (w, x, y, z) denotes an event type where w puts x down on y which is resting on z. It is specified as PUTDOWN (w, x, y), where z supports but is not attached to y and z is distinct from w, x, and y. UNSTACK (w, x, y, z) denotes an event type where w picks x up off of y which is resting on z. It is specified as PICKUP (w, x, y), where z supports but is not attached to y and z is distinct from w, x, and y. MOVE (w, x, y, z) denotes an event type where w picks x up off of y and puts it down on z which is distinct from y. ASSEMBLE (w, x, y, z) denotes an event type where w first puts y down on z then sometime later stacks x on top of y. Finally, DISASSEMBLE (w, x, y, z) denotes an event type where w first unstacks x from on top of y (which is resting on z) and then sometime later picks y up off of z. FIGS. 5A and 5B show sample movies depicting occurrences of the event types PICKUP (x, y, z) and PUTDOWN (x, y, z), respectively. FIGS. 7A–7E show sample movies depicting occurrences of the event types STACK (w, x, y, z), UNSTACK (w, x, y, z), MOVE (w, x, y, z), ASSEMBLE (w, x, y, z), and DISASSEMBLE (w, x, y, z), respectively.

Nominally, all atomic event-logic expressions are primitive event types. However, we allow giving a name to a compound event-logic expression and using this name in another event-logic expression as short hand for the named expression with appropriate parameter substitution. This is simply a macro-expansion process and, as such, no recursion is allowed. This feature is used in FIG. 4 to define UNSTACK, MOVE, and DISASSEMBLE in terms of PICKUP, STACK, MOVE, and ASSEMBLE in terms of STACK, which is itself defined in terms of PUTDOWN, and DISASSEMBLE in terms of UNSTACK, which is itself defined in terms of PICKUP.

The methods of the present invention have been applied to compute the occurrences of the compound event types from FIG. 4 from the occurrences of the primitive event types from FIG. 3 as recovered from a number of input video sequences. This constitutes an implementation of step 108 as shown in FIG. 1. FIGS. 6, 8, 10, and 12 show both the primitive event occurrences that have been recovered from the input video sequences in FIGS. 5, 7, 9, and 11 using methods in the prior art as well as the compound event occurrences that have been recognized out of the primitive event occurrences using the methods of the present invention. FIGS. 5A, 5B, and 7A–7E show sample movies that depict the seven compound event types pick up, put down, stack, unstack, move, assemble, and disassemble respectively. The results of applying segmentation, tracking, and model reconstruction methods of the prior art on these video sequences are shown overlayed on the video sequences. FIGS. 6A, 6B, and 8A–8E show the results of applying the event classification methods of the present invention on these movies. These figures show that the computer system implementation of the methods of the present invention correctly recognized the intended event class for each movie.

Figure 7B:
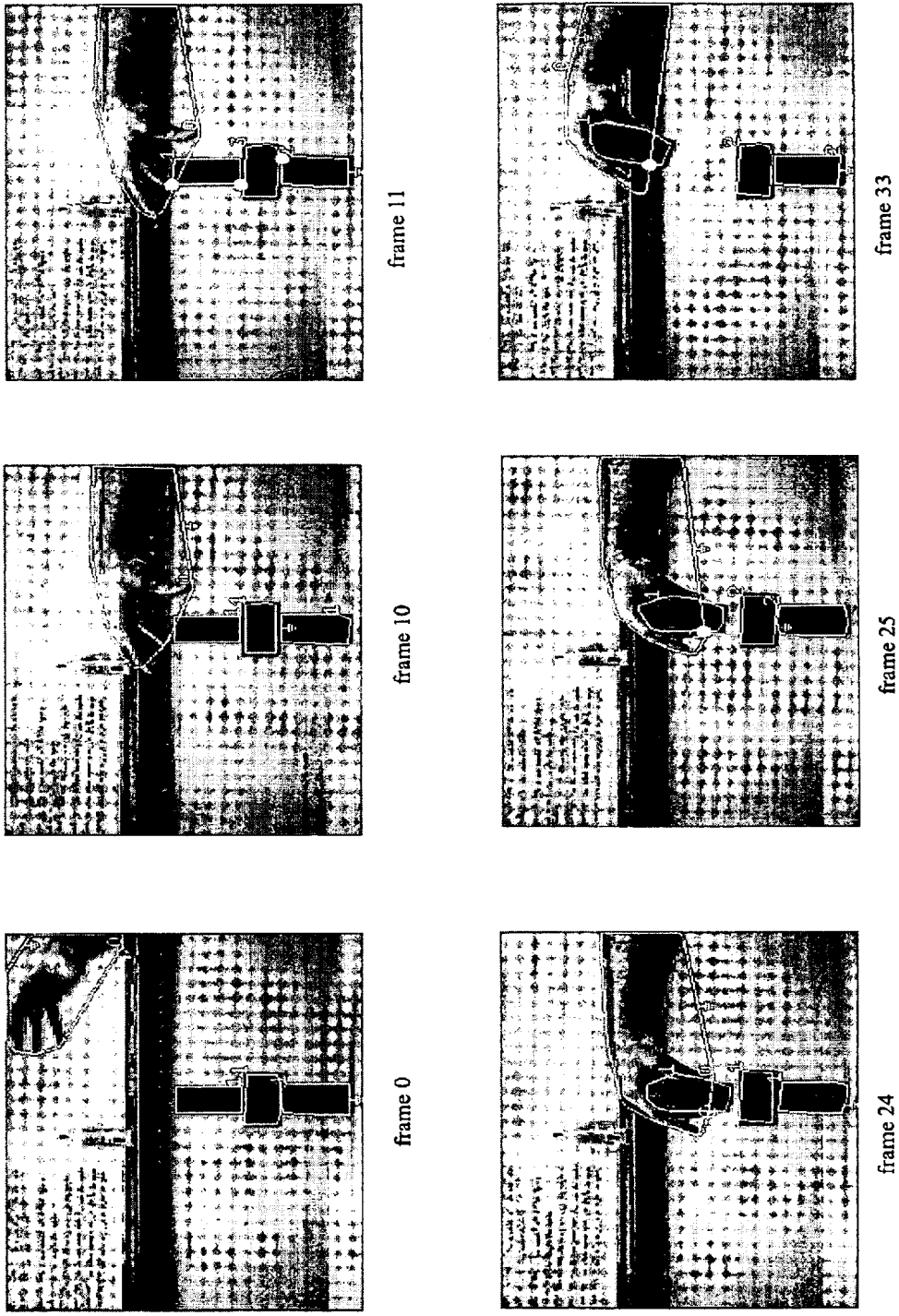
Figure 7D:
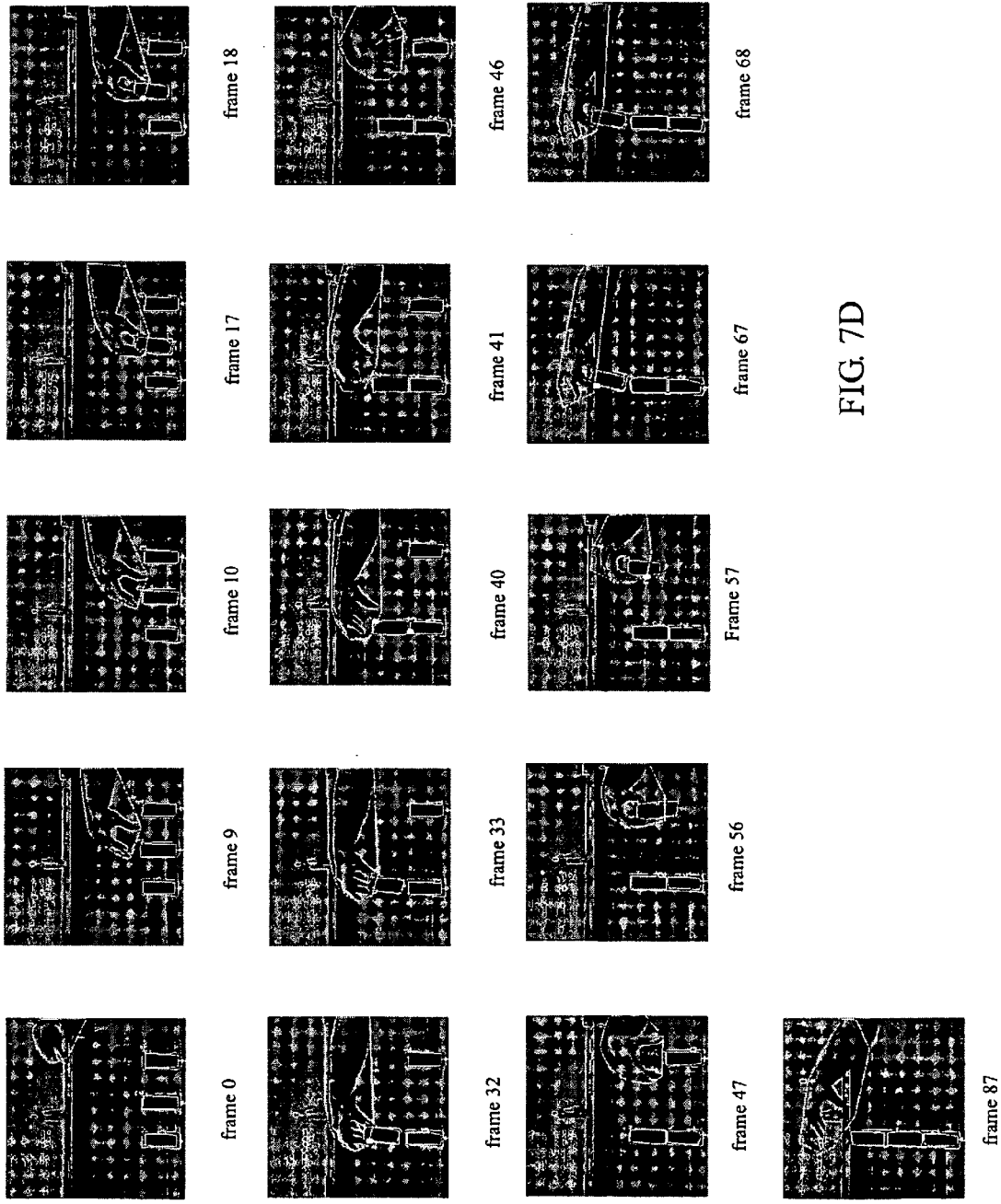
Figure 7E:
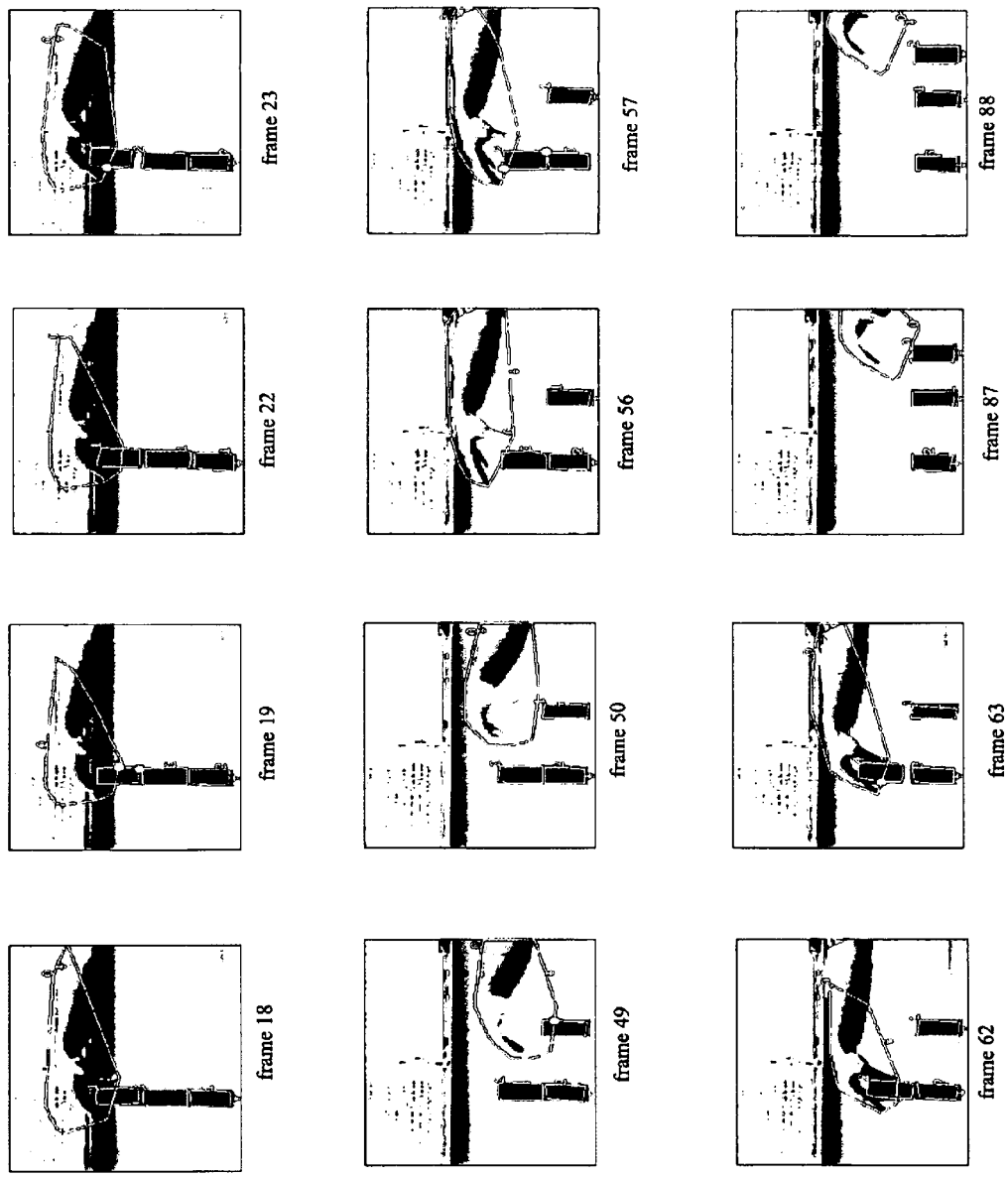

In FIG. 5A, frames 0 through 1 correspond to the first subevent of a pick up event, frames 2 through 13 correspond to the second subevent, and frames 14 through 22 correspond to the third subevent. In FIG. 5B, frames 0 through 13 correspond to the first subevent of a put down event, frames 14 through 22 correspond to the second subevent, and frames 23 through 32 correspond to the third subevent. The computer system correctly recognized these as instances of pick up and put down respectively. In FIG. 7A, frames 0 through 11, 12 through 23, and 24 through 30 correspond to the three subevents of a put down event. The computer system correctly recognized this as a put down event and also as a stack event. In FIG. 7B, frames 0 through 10, 11 through 24, and 25 through 33 correspond to the three subevents of a pick up event. The computer system correctly recognized this as a pick up event and also as an unstack event. In FIG. 7C, frames 0 through 8, 9 through 16, and 17 through 45 correspond to the three subevents of a pick up event and frames 17 through 33, 34 through 45, and 46 through 52 correspond to the three subevents of aput down event. The computer system correctly recognized the combination of these two events as a move event. In FIG. 7D, frames 18 through 32, 33 through 40, and 41 through 46 correspond to the three subevents of a put down event and frames 57 through 67 and 68 through 87 correspond to the first and third subevents of a second put down event, with the second subevent being empty. The latter put down event was also correctly recognized as a stack event and the combination of these two events was correctly recognized as an assemble event. In FIG. 7E, frames 18, 19 through 22, and 23 through 50 correspond to the three subevents of a pick up event and fames 23 through 56, 57 through 62, and 63 through 87 correspond to the three subevents of a second pick up event. The former pick up event was also correctly recognized as an unstack event and the combination of these two events was correctly recognized as a disassemble event. These examples show that the computer system correctly recognized each of the seven event types with no false positives.

As discussed in the introduction, using force dynamics and event logic to recognize events offers several advantages over the prior art of using motion profile and hidden Markov models. These advantages are:

(1) robustness against variance in motion profile;

(2) robustness against presence of extraneous objects in the field of view;

(3) ability to perform temporal and spatial segmentation of events; and (4) ability to detect non-occurrence of events.

Figure 9C:
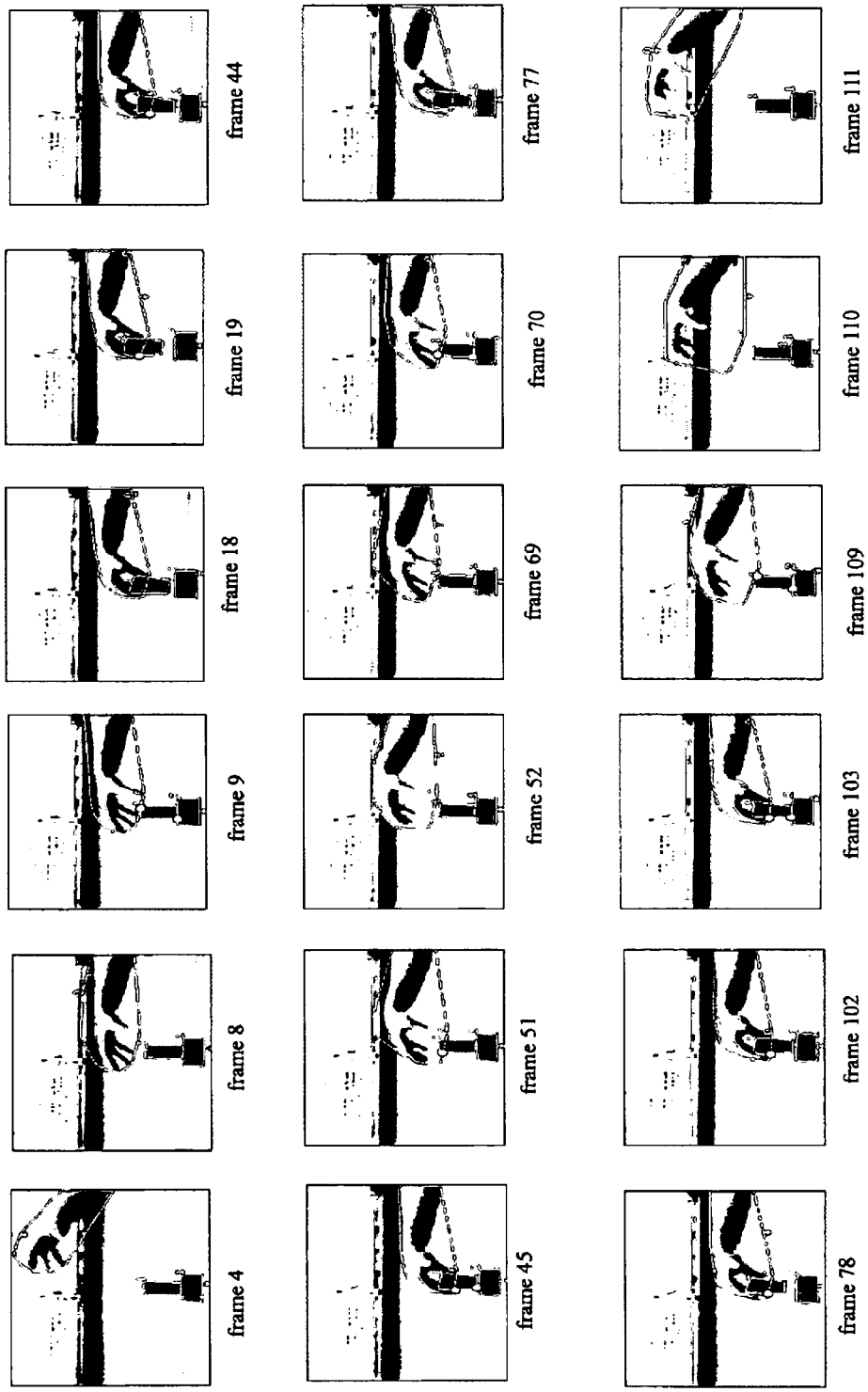

FIGS. 9A–9D and 10A–10D illustrate the first three of these advantages while FIGS. 11A, 11B, 12A, and 12B illustrate the third. FIG. 9A shows a pick up event from the left in contrast to FIG. 5A which is from the right. Even though these have different motion profiles, FIG. 10A shows that the computer system correctly recognized that these exhibit the same sequence of changes in force-dynamic relations and constitute the same event type, namely pick up. FIG. 9B shows a pick up event with two extraneous blocks in the field of view. FIG. 10B shows that the computer system correctly recognized that these extraneous blocks do not participate in any events and, despite their presence, the truth conditions for a pick up event still hold between the other objects. FIG. 9C shows a pick up event, followed by a put down event, followed by another pick up event, followed by another put down event. FIG. 10C shows that the computer system correctly recognizes this sequence of four event occurrences. FIG. 9D shows two simultaneous pick up events. FIG. 10D shows that the computer system correctly recognized these two simultaneous event occurrences. Finally, FIGS. 11A and 11B show two non-events. FIGS. 12A and 12B show that the computer system is not fooled into thinking that these constitute pick up or put down events, even though portions of these events have similar motion profile to pick up and put down events. Therefore, the computer system correctly recognizes that these movies do not match any known event types.

The methods of the present invention are incorporated in a comprehensive implemented system for recovering event occurrences from video input. It differs from prior approaches to the same problem in two fundamental ways. It uses state changes in the force-dynamic relations between objects, instead of motion profile, as the key descriptive element in defining event types. And it uses event logic, instead of hidden Markov models, to perform event classification. One key result of the methods of the present invention is the formulation of spanning intervals, a novel efficient representation of the infinite sets of intervals that arise when processing liquid and semi-liquid events. A second key result is the formulation of an efficient procedure, based on spanning intervals, for inferring all occurrences of compound event types from occurrences of primitive event types. The techniques of force-dynamic model reconstruction, spanning intervals, and event-logic inference have been used to successfully recognize seven event types from real video: pick up, put down, stack, unstack, move, assemble, and disassemble. Using force-dynamics and event logic to perform event recognition offers four key advantages over the prior art of using motion profile and hidden Markov models. First, it is insensitive to variance in the motion profile of an event occurrence. Second, it is insensitive to the presence of extraneous objects in the field of view. Third, it allows temporal segmentation of sequential and parallel event occurrences. And fourth, it robustly detects the non-occurrence of events as well as their occurrence.

As discussed above, the methods of the present invention are particularly suited to be carried out by a computer software program, such computer software program preferably containing modules corresponding to the individual steps of the methods. Such software can, of course, be embodied in a computer-readable medium, such as an integrated circuit or a peripheral device.

While there has been shown and described what is considered to be preferred embodiments of the invention, it will, of course, be understood that various modifications and changes in form or detail could readily be made without departing from the spirit of the invention. It is therefore intended that the invention be not limited to the exact form described and illustrated, but should be constructed to cover all modifications that may fall within the scope of the appended claims.

What is claimed is:

1. A computer implemented method for recognizing compound events depicted in video sequences, said compound events being determined from occurrences of primitive events depicted in the video sequences, wherein the compound events are defined as a combination of the primitive events, the method comprising the steps of:

(a) defining primitive event types, said primitive event types including: x=y; Supported(x); RigidlyAttached(x, y); Supports(x, y); Contacts(x, y); and Attached(x, y);

(b) defining combinations of the primitive event types as a compound event type, said compound event type being one of: PickUp(x,y,z); PutDown(x,y,z); Stack(w, x,y,z); Unstack(w,x,y,z); Move(w,x,y,z); Assemble(w, x,y,z); and Disassemble(w,x,y,z);

(c) inputting, a series of video sequences, said video sequences depicting primitive event occurrences, such occurrences being specified as a set of temporal intervals over which a given primitive event type is true; and (d) determining, the compound event occurrences, such occurrences being specified as the set of temporal intervals over which the compound event type is true, wherein the sets of temporal intervals in steps (c) and (d) are specified as smaller sets of spanning intervals, each spanning interval representing a set of all sub-intervals over which the primitive event type holds and wherein the spanning intervals take the form $_\alpha[_\gamma[i,j]_{\delta,\epsilon}[k,l]_\zeta]_\beta$, where $\alpha$, $\beta$, $\gamma$, $\delta$, $\epsilon$, and $\zeta$ are Boolean values, i,j,k, and l are real numbers, $_\alpha[_\gamma[i,j]_{\delta,\epsilon}[k,l]_\zeta]_\beta$ represents the set of all intervals $_\alpha[p,q]_\beta$ where $i\leq_\gamma p\leq_\delta j$ and $k\leq_\epsilon q\leq_\zeta l$, $_\alpha[p,q]_\beta$ represents the set of all points r, where $p\leq_\alpha r\leq_\beta q$, and $x\leq_\theta y$ means $x\leq y$ when $\theta$ is true and $x<y$ when $\theta$ is false.

2. The method according to claim 1, wherein the compound event type in step (b) is specified as an expression in temporal logic.

3. The method according to claim 2, wherein the temporal logic expressions are constructed the logical connectives $\forall$, $\exists$, $\vee$, $\wedge_R$, $\diamond_R$, and $\neg$, where R ranges over sets of relations between one-dimensional intervals.

4. The method according to claim 3, wherein the relations are =, <, >, m, mi, o, oi, s, si, f, fi, d, and di.

5. The method according to claim 4, wherein the compound event occurrences are computed through the use of the following set of equations:

$$\varepsilon(M, p(c_1, \ldots, c_n)) \triangleq \{i \mid p(c_1, \ldots, c_n) @ i \in M\}$$

$$\varepsilon(M, \Phi \vee \Psi) \triangleq \varepsilon(M, \Phi) \cup \varepsilon(M, \Psi)$$

$$\varepsilon(M, \forall x\Phi) \triangleq \bigcup_{i_1 \in \varepsilon(M, \Phi[x:=c_1])} \cdots \bigcup_{i_1 \in \varepsilon(M, \Phi[x:=c_n])} i_1 \cap \ldots \cap i_n$$

where $C(M) = \{c_1, \ldots, c_n\}$ $$\varepsilon(M, \exists x\Phi) \triangleq \bigcup_{c \in C(M)} \varepsilon(M, \Phi[x:=c])$$

$$\varepsilon(M, \neg \Phi) \triangleq \bigcup_{i'_1 \in \neg_1} \cdots \bigcup_{i'_n \in \neg_n} i'_1 \cap \ldots \cap i'_n$$

where $\varepsilon(M, \Phi) = \{i_1, \ldots, i_n\}$ $$\varepsilon(M, \Phi \wedge_R \Psi) \triangleq \bigcup_{i \in \varepsilon(M,\Phi)} \bigcup_{j \in \varepsilon(M,\Psi)} \bigcup_{r \in R} \mathcal{I}(i, r, j)$$

$$\varepsilon(M, \diamond_R, \Phi) \triangleq \bigcup_{i \in \varepsilon(M,\Phi)} \bigcup_{r \in R} \mathcal{D}(r, i)$$

where, $$\left\langle _\alpha[_\gamma[i,j]_{\delta,\epsilon}[k,l]_\zeta]_\beta \right\rangle \triangleq \begin{cases} \left\{_\alpha[_{\gamma'}[i,j']_{\delta',\epsilon'}[k',l]_{\zeta'}]_\beta\right\} \\ \text{where } j' = \min(j, l) \\ k' = \max(k, i) \\ \gamma' = \gamma \wedge i \neq -\infty \\ \delta' = \delta \wedge \min(j, l) \neq \infty \wedge (j < l \vee \zeta \wedge \alpha \wedge \beta) \\ \epsilon' = \epsilon \wedge \max(k, i) \neq -\infty \wedge (k > i \vee \gamma \wedge \beta \wedge \alpha) \\ \zeta' = \zeta \wedge l \neq \infty \\ \text{when } i \leq j' \wedge k' \leq l \wedge \\ [i = j' \rightarrow (\gamma' \wedge \delta')] \wedge [k' = l \rightarrow (\epsilon' \wedge \zeta')] \wedge \\ [i = l \rightarrow (\alpha \wedge \beta)] \wedge \\ i \neq \infty \wedge j' \neq -\infty \wedge k' \neq \infty \wedge l \neq -\infty \\ \{\} \text{ otherwise} \end{cases}$$

$$\alpha_1\left[y_1[i_1, j_1]_{\delta_1,\epsilon_1}[k_1, l_1]_{\zeta_1}\right]_{\beta_1} \cap \alpha_2\left[y_2[i_2, j_2]_{\delta_2,\epsilon_2}[k_2, l_2]_{\zeta_2}\right]_{\beta_2} \triangleq$$

$$\left\langle \alpha_1\left[\gamma[\max(i_1, i_2), \min(j_1, j_2)]_{\delta,\epsilon}[\max(k_1, k_2), \min(l_1, l_2)]_\zeta\right]_{\beta_1} \right\rangle$$

where $\gamma = \begin{cases} \gamma_1 & i_1 > i_2 \\ \gamma_1 \wedge \gamma_2 & i_1 = i_2 \\ \gamma_2 & i_1 < i_2 \end{cases}$ $\delta = \begin{cases} \delta_1 & j_1 < j_2 \\ \delta_1 \wedge \delta_2 & j_1 = j_2 \\ \delta_2 & j_1 > j_2 \end{cases}$ $\epsilon = \begin{cases} \epsilon_1 & k_1 > k_2 \\ \epsilon_1 \wedge \epsilon_2 & k_1 = k_2 \\ \epsilon_2 & k_1 < k_2 \end{cases}$ $\zeta = \begin{cases} \zeta_1 & l_1 < l_2 \\ \zeta_1 \wedge \zeta_2 & l_1 = l_2 \\ \zeta_2 & l_1 > l_2 \end{cases}$ when $\alpha_1 = \alpha_2 \wedge \beta_1 = \beta_2$ $\{\ \}$ otherwise $$\neg_\alpha [\gamma [i,j]_{\delta,\in} [k,l]_\zeta]_\beta \triangleq \begin{pmatrix} \langle \alpha[T[-\infty,\infty]_{T,T} [-\infty,k]_{\neg\epsilon}]_\beta \rangle \cup \\ \langle \alpha[T[-\infty,\infty]_{T,\neg\zeta} [l,\infty]_T]_\beta \rangle \cup \\ \langle \alpha[T[-\infty,i]_{\neg\gamma,T} [-\infty,\infty]_T]_\beta \rangle \cup \\ \langle \alpha[\neg\delta[j,\infty]_{T,T} [-\infty,\infty]_T]_\beta \rangle \cup \\ \langle \neg\alpha[T[-\infty,\infty]_{T,T} [-\infty,\infty]_T]_\beta \rangle \cup \\ \langle \alpha[T[-\infty,\infty]_{T,T} [-\infty,\infty]_T]_{\neg\beta} \rangle \cup \\ \langle \neg\alpha[T[-\infty,\infty]_{T,T} [-\infty,\infty]_T]_{\neg\beta} \rangle \end{pmatrix}$$

$$SPAN\left(\alpha_1[\gamma_1[i_1,j_1]_{\delta_1,\in_1}[k_1,l_1]_{\zeta_1}]_{\beta_1}, \alpha_2[\gamma_2[i_2,j_2]_{\delta_2,\in_2}[k_2,l_2]_{\zeta_2}]_{\beta_2}\right) \triangleq$$

$$\begin{pmatrix} \langle \alpha_1[\gamma_1[i_1,j]_{\delta,\in}[k,l_1]_{\zeta_1}]_{\beta_1} \rangle \cup \\ \langle \alpha_1[\gamma_1[i_1,j]_{\delta,\in}[k,l_2]_{\zeta_2}]_{\beta_2} \rangle \cup \\ \langle \alpha_2[\gamma_2[i_2,j]_{\delta,\in}[k,l_1]_{\zeta_1}]_{\beta_1} \rangle \cup \\ \langle \alpha_2[\gamma_2[i_2,j]_{\delta,\in}[k,l_2]_{\zeta_2}]_{\beta_2} \rangle \end{pmatrix}$$

where $j = \min(j_1, j_2)$ $k = \max(k_1, k_2)$ $\delta = [(\delta_1 \wedge j_1 \leq j_2) \vee (\delta_2 \wedge j_1 \geq j_2)]$ $\epsilon = [(\epsilon_1 \wedge k_1 \leq k_2) \vee (\epsilon_2 \wedge k_1 \geq k_2)]$ $\mathcal{D}(=,1) \triangleq \{i\}$ $\mathfrak{P}(=,i) \triangleq \{i\}$ $\mathfrak{P}\left(<, \alpha_1[\gamma_1[i_1,j_1]_{\delta_1,\in_1}[k_1,l_1]_{\zeta_1}]_{\beta_1}\right) \triangleq \bigcup_{\alpha_2,\beta_2 \in \{T,F\}} \langle \alpha_2[\neg\beta_1 \wedge \neg\alpha_2 \wedge \in_1[k_1,\infty]_{T,T}[-\infty,\infty]_T]_{\beta_2} \rangle$ $\mathfrak{P}\left(>, \alpha_1[\gamma_1[i_1,j_1]_{\delta_1,\in_1}[k_1,l_1]_{\zeta_1}]_{\beta_1}\right) \triangleq \bigcup_{\alpha_2,\beta_2 \in \{T,F\}} \langle \alpha_2[T[-\infty,\infty]_{T,T}[-\infty,j_1]_{\neg\alpha_1 \wedge \neg\beta_2 \wedge \delta_1}]_{\beta_2} \rangle$ $\mathfrak{P}\left(m, \alpha_1[\gamma_1[i_1,j_1]_{\delta_1,\in_1}[k_1,l_1]_{\zeta_1}]_{\beta_1}\right) \triangleq \bigcup_{\beta_2 \in \{T,F\}} \langle \neg\beta_1[\in_1[k_1,l_1]_{\zeta_1,T}[-\infty,\infty]_T]_{\beta_2} \rangle$ $\mathfrak{P}\left(mi, \alpha_1[\gamma_1[i_1,j_1]_{\delta_1,\in_1}[k_1,l_1]_{\zeta_1}]_{\beta_1}\right) \triangleq \bigcup_{\alpha_2 \in \{T,F\}} \langle \alpha_2[T[-\infty,\infty]_{T,\gamma_1}[i_1,j_1]_{\delta_1}]_{\neg\alpha_1} \rangle$ $\mathfrak{P}\left(o, \alpha_1[\gamma_1[i_1,j_1]_{\delta_1,\in_1}[k_1,l_1]_{\zeta_1}]_{\beta_1}\right) \triangleq \bigcup_{\alpha_2,\beta_2 \in \{T,F\}} \langle \alpha_2[\alpha_1 \wedge \neg\alpha_2 \wedge \gamma_1[i_1,l_1]_{\beta_1 \wedge \alpha_2 \wedge \zeta_1, \neg\beta_1 \wedge \beta_2, \in_1}[k_1,\infty]_T]_{\beta_2} \rangle$ $\mathfrak{P}\left(oi, \alpha_1[\gamma_1[i_1,j_1]_{\delta_1,\in_1}[k_1,l_1]_{\zeta_1}]_{\beta_1}\right) \triangleq \bigcup_{\alpha_2,\beta_2 \in \{T,F\}} \langle \alpha_2[T[-\infty,j_1]_{\neg\alpha_1 \wedge \alpha_2 \wedge \delta_1, \alpha_1 \wedge \beta_2 \wedge \gamma_1}[i_1,l_1]_{\beta_1 \wedge \beta_2 \wedge \zeta_1}]_{\beta_2} \rangle$ $\mathfrak{P}\left(s, \alpha_1[\gamma_1[i_1,j_1]_{\delta_1,\in_1}[k_1,l_1]_{\zeta_1}]_{\beta_1}\right) \triangleq \bigcup_{\beta_2 \in \{T,F\}} \langle \alpha_1[\gamma_1[i_1,j_1]_{\delta_1, \neg\beta_1 \wedge \beta_2 \wedge \in_1}[k_1,\infty]_T]_{\beta_2} \rangle$ $\mathfrak{P}\left(si, \alpha_1[\gamma_1[i_1,j_1]_{\delta_1,\in_1}[k_1,l_1]_{\zeta_1}]_{\beta_1}\right) \triangleq \bigcup_{\beta_2 \in \{T,F\}} \langle \alpha_1[\gamma_1[i_1,j_1]_{\delta_1, T}[-\infty,l_1]_{\beta_1 \wedge \neg\beta_2 \wedge \zeta_1}]_{\beta_2} \rangle$ $\mathfrak{P}\left(f, \alpha_1[\gamma_1[i_1,j_1]_{\delta_1,\in_1}[k_1,l_1]_{\zeta_1}]_{\beta_1}\right) \triangleq \bigcup_{\alpha_2 \in \{T,F\}} \langle \alpha_2[T[-\infty,j_1]_{\neg\alpha_1 \wedge \alpha_2 \wedge \delta_1, \in_1}[k_1,l_1]_{\zeta_1}]_{\beta_1} \rangle$ $\mathfrak{P}\left(fi, \alpha_1[\gamma_1[i_1,j_1]_{\delta_1,\in_1}[k_1,l_1]_{\zeta_1}]_{\beta_1}\right) \triangleq \bigcup_{\alpha_2 \in \{T,F\}} \langle \alpha_2[\alpha_1 \wedge \neg\alpha_2 \wedge \gamma_1[i_1,\infty]_{T,\in_1}[k_1,l_1]_{\zeta_1}]_{\beta_1} \rangle$ $\mathfrak{P}\left(d, \alpha_1[\gamma_1[i_1,j_1]_{\delta_1,\in_1}[k_1,l_1]_{\zeta_1}]_{\beta_1}\right) \triangleq \bigcup_{\alpha_2,\beta_2 \in \{T,F\}} \langle \alpha_2[T[-\infty,j_1]_{\neg\alpha_1 \wedge \alpha_2 \wedge \delta_1, \neg\beta_1 \wedge \beta_2 \wedge \in_1}[k_1,\infty]_T]_{\beta_2} \rangle$ $\mathfrak{P}\left(di, \alpha_1[\gamma_1[i_1,j_1]_{\delta_1,\in_1}[k_1,l_1]_{\zeta_1}]_{\beta_1}\right) \triangleq \bigcup_{\alpha_2,\beta_2 \in \{T,F\}} \langle \alpha_2[\alpha_1 \wedge \neg\alpha_2 \wedge \gamma_1[i_1,\infty]_{T,T}[-\infty,l_1]_{\beta_1 \wedge \neg\beta_2 \wedge \zeta_1}]_{\beta_2} \rangle$ and, $\mathcal{A}(i,r,j) \triangleq \bigcup_{i' \in \mathcal{D}(r^{-1},j)} \bigcup_{i'' \in i' \cap i} \bigcup_{j' \in \mathfrak{P}(r,i)} \bigcup_{j'' \in j' \cap j} SPAN(i'', j'')$.

\* \* \* \* \*